United States Patent
Wakamatsu et al.

[15] 3,641,844
[45] Feb. 15, 1972

[54] AUTOMATIC TRANSMISSION SYSTEM

[72] Inventors: Hisato Wakamatsu, Kariya-shi; Takaaki Kato, Toyohashi-shi; Mamoru Kawakubo; Katsunori Ito, both of Kariya-shi, all of Japan

[73] Assignee: Nippon Denso Kabushiki Kaisha, Kariya-shi, Japan

[22] Filed: Sept. 16, 1969

[21] Appl. No.: 858,300

[30] Foreign Application Priority Data
Oct. 28, 1968 Japan..................................43/78388

[52] U.S. Cl..................................................74/752, 74/866
[51] Int. Cl......................................F16h 5/42, F16h 19/00
[58] Field of Search..........................................74/752, 866

[56] References Cited

UNITED STATES PATENTS

| | | | |
|---|---|---|---|
| 3,354,744 | 11/1967 | Kuhnle et al. | 74/866 X |
| 3,448,640 | 6/1969 | Nelson | 74/752 X |
| 3,478,851 | 11/1969 | Smyth et al. | 74/866 X |

*Primary Examiner*—Arthur T. McKeon
*Attorney*—Cushman, Darby & Cushman

[57] ABSTRACT

An automatic transmission system having a speed changing unit including a torque converter and speed-changing gear means, actuators for varying the meshing engagement of the gears, a hydraulic circuit for controlling the actuators, and an electronic circuit. In the apparatus, the electronic circuit computes the ratio between the rotating speed of the input shaft of the torque converter and the rotating speed of the input or output shaft of the speed-changing gear means to deliver an output signal which is used to actuate a distributing valve in the hydraulic actuating circuit to effect the changing of speed.

4 Claims, 27 Drawing Figures

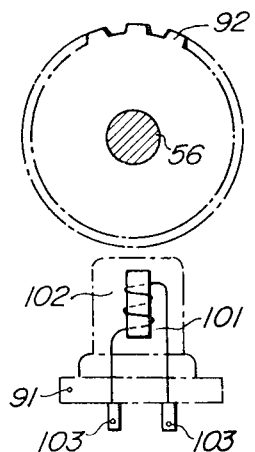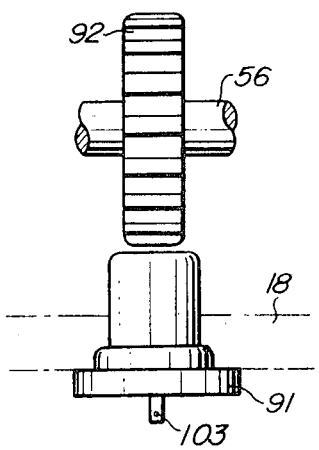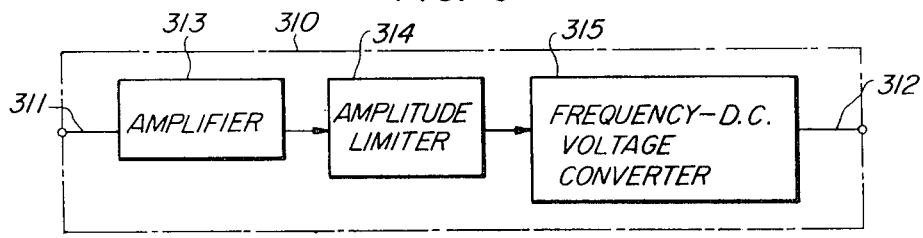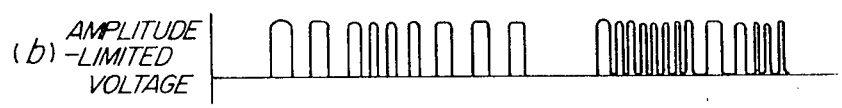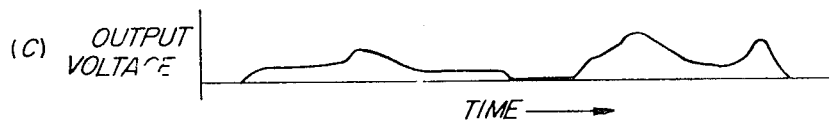

AUTOMATIC TRANSMISSION SYSTEM

BACKGROUND OF THE INVENTION

1. Field of the Invention

This invention relates to a transmission system for automotive vehicles and the like, and more particularly to an automatic transmission system comprising a hydraulic torque converter and a multispeed gear-changing means.

2. Description of the Prior Art

In an automatic transmission system employed heretofore in common passenger cars, the speed-changing point is generally determined from a signal representing the vehicle speed (taken from the output shaft of multispeed gear-changing means) and a signal representing the negative pressure (boost pressure) in the air intake pipe of the prime mover or internal combustion engine or a signal representing the amount of depression of the accelerator pedal actuated by the driver. A commonly employed method comprises obtaining these signals in the form of a high and a low hydraulic pressure, determining the speed-changing point on the basis of the interrelation between these two hydraulic pressures, and opening and closing related valves for selectively hydraulically operating an actuator such as a multiple disc clutch and a brake band. Thus, in the conventional automatic transmission system which is wholly controlled by means of hydraulic pressure, the detected signals in the form of hydraulic pressures are subject to errors and therefor are generally inaccurate. This means that the speed-changing point is also frequently subjected to error. Further, the hydraulic actuating circuit is generally complex and it is not an easy matter to impart thereto an improved function over the existing function. For example, when abrupt deceleration is required while the vehicle is going up a slope at a relatively high speed, release of the depression pressure imparted to the accelerator pedal causes gear changing into a position one stage higher before the desired deceleration takes place, and redepression of the accelerator pedal immediately thereafter for the purpose of acceleration causes gear changing into a position one stage lower, thus putting the driver to inconvenience. Moreover, when the vehicle is going down a decline at a relatively high speed, the speed tends to increase in spite of the fact that engine braking is required, and gear changing to the low gear side cannot be automatically effected. In such a case, commonly, the driver must manually shift the gear to a lower gear in order to avoid such inconvenience. Thus, the conventional automatic transmission system involves fundamental defects due to the fact that the speed-changing point is determined solely on the basis of the load on the internal combustion engine and the vehicle speed, and that no consideration is given to factors such as the internal state of the transmission system.

SUMMARY OF THE INVENTION

The present invention is featured by the fact that the slip of a torque converter constitutes an important element of a transmission system, and this serves as the main factor for determining the speed changing point. An electronic circuit is introduced for the purpose of determining the speed transition point, so that the electronic circuit delivers speed changing instructions. Which are most suitable for a specific condition of speed variation, thereby to operate suitable actuators through a hydraulic actuating circuit to effect the desired control.

It is a primary object of the present invention to provide an automatic transmission system which possesses an appropriate speed-changing function even when the engine is running with engine brake while going down a slope, needless to say under normal running conditions, which possesses a simplified mechanical structure for the hydraulic system associated with the actuators, which includes improved means for preventing an error in the speed-changing point due to a variation in the hydraulic pressure, and which possesses a more accurate and higher operating function than heretofore.

The above and other objects, features and advantages of the present invention will be apparent from the following detailed description taken in conjunction with the accompanying drawings.

BRIEF DESCRIPTION OF THE DRAWINGS

FIGS. 8a and 8b are a side elevational view and a front elevational view, respectively, of a revolution detector preferably used in the apparatus.

FIG. 9 is a block diagram showing the structure of a revolution operating circuit in the circuit shown in FIG. 7.

FIG. 10 is a graphic illustration of the operating voltage waveforms in the revolution operating circuit shown in FIG. 9.

DESCRIPTION OF THE PREFERRED EMBODIMENTS

It is the first feature of the present invention that the automatic transmission system is composed essentially of three parts, that is, a speed-changing unit equipped with a hydraulic torque converter, a hydraulic actuating circuit, and an electronic operation circuit and a logic circuit as apparent from an embodiment thereof which will be described in detail hereunder.

I. Structure of a Two-Forward-Speed Automatic Speed-Changing Unit

Figure 1:
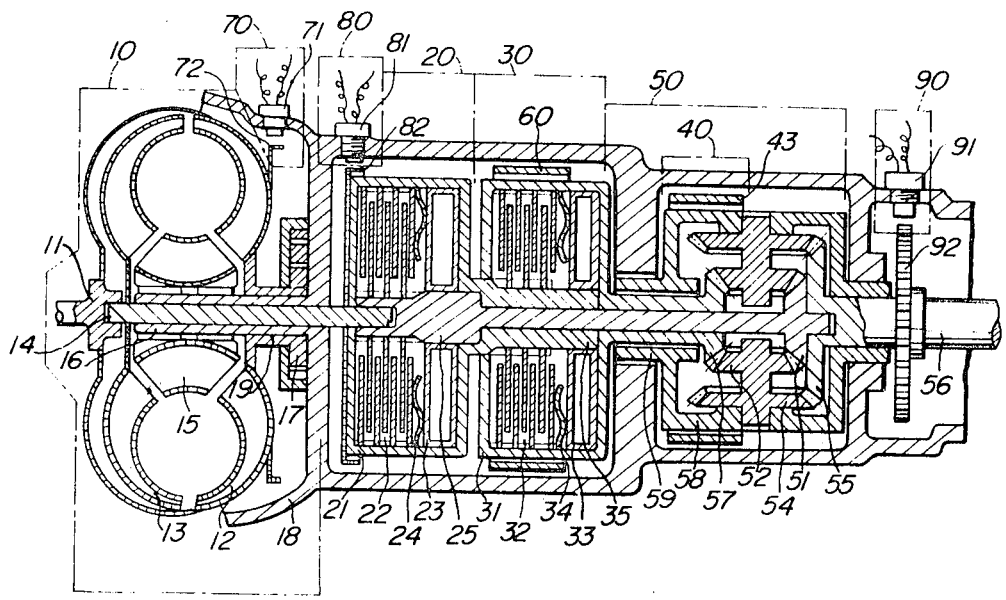
FIG. 1 is a sectional view of a speed-changing unit preferably used in an automatic transmission system embodying the present invention.

A two-forward-speed automatic speed-changing unit equipped with a hydraulic torque converter as shown in FIG. 1 will be taken as a typical example of the automatic speed-changing unit.

It will be understood, however, that the present invention is in no way limited to such a two-forward-speed gear-changing unit and is similarly applicable to a three or more forward speed automatic speed-changing unit.

Referring to FIG. 1, the two-forward-speed automatic speed-changing unit comprises a hydraulic torque converter 10, a front clutch 20, a rear clutch 30, a rear brake 40 and a gear train 50. At the input side of the hydraulic torque converter 10, the rotary output shaft of an internal combustion engine (not shown) is directly connected to a shaft 11 which is in turn directly connected to a torque converter pump 12. The torque converter 10 includes the torque converter pump 12, a torque converter turbine 13 disposed opposite to the pump 12, and a stator 15 disposed between the pump 12 and the turbine 13. The stator 15 is provided with a one-way clutch 16. Since the operation of these elements is well known in the art, any detailed description will not be given herein. The torque converter pump 12 discharges a circulating flow of hydraulic fluid and the torque converter turbine 13 is driven by the momentum of the circulating flow to transmit a driving force to the shaft 14 of the torque converter turbine 13. Thus, a difference exists between the rotation of the torque converter pump 12 and the rotation of the torque converter turbine 13 and the rotating force is transmitted with such a rotational difference. With a small rotational difference, a small torque is transmitted, while with a large rotational difference, a large torque is transmitted. The torque converter 10 thus has a function of transmitting a varying rotational force. According to another expression, the rotational difference is expressed by a revolution ratio or slip ratio.

A hydraulic pump 17 which may be a gear pump is directly connected to the pump shaft 11 for a purpose which will be described later. The front clutch 20 is composed of a clutch drum 21 connected integrally with the turbine shaft 14, a multiple disc clutch 22, a clutch piston 23, a spring plate 24 and a clutch shaft 25. When an actuating hydraulic pressure is applied thereto, the front clutch 20 acts to couple the shaft 14 of the torque converter turbine 13 to the clutch shaft 25.

The rear clutch 30 is composed of a clutch shaft 35 connected integrally with the clutch drum 21, a clutch drum 31, a multiple disc clutch 32, a clutch piston 33 and a spring plate 34. When an actuating hydraulic pressure is applied thereto, the rear clutch 30 acts to couple the clutch drum 21 to the clutch drum 31.

Figure 2:
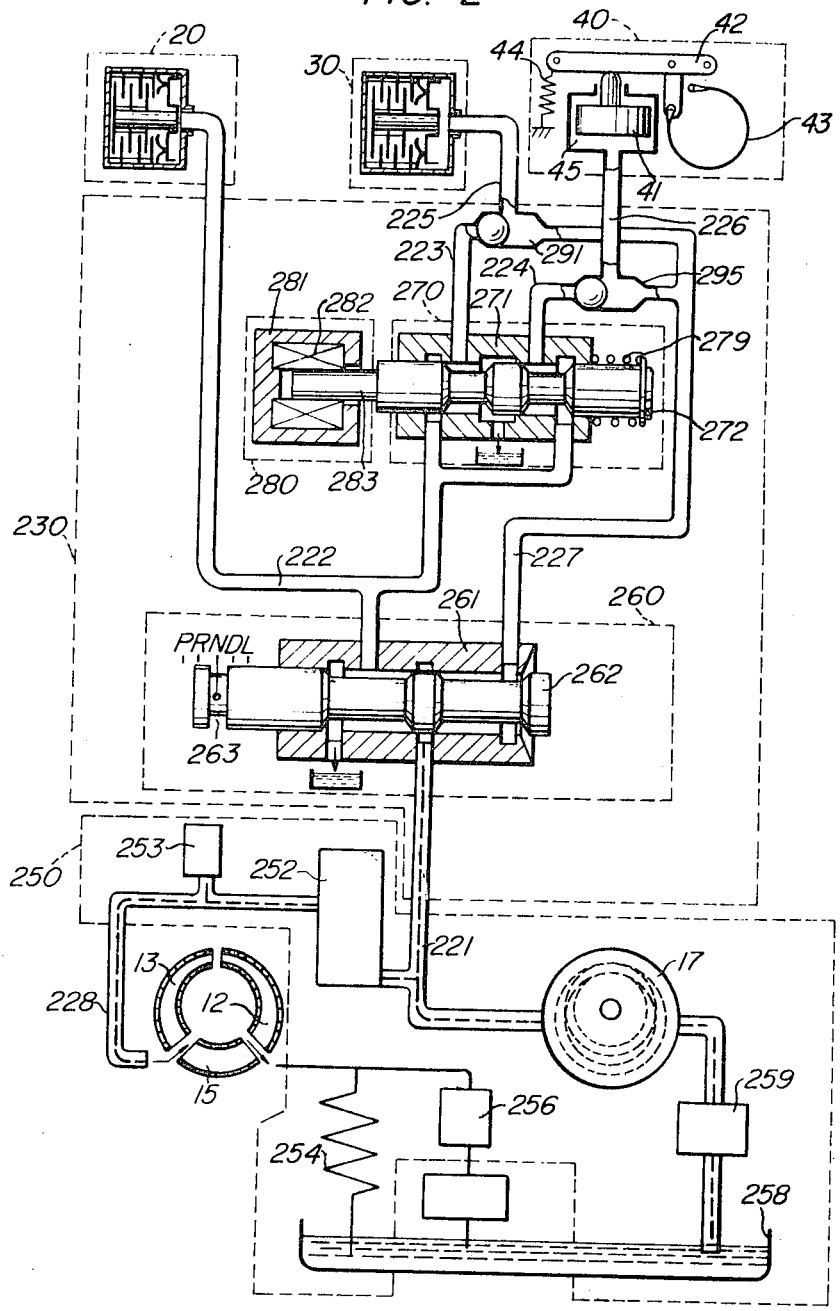
FIGS. 2, 3, 4 and 5 are diagrammatic views illustrating the operation of a hydraulic actuating circuit when the present invention is adapted to a two-forward-speed automatic transmission system, in which the hydraulic actuating circuit is shown in its N, DL, DH and R positions, respectively.

As shown in FIG. 2, the rear brake 40 is composed of a brake piston 41, a brake link 42, a brake band 43, a return spring 44, and a brake cylinder 45. When an actuating hydraulic pressure is applied thereto, the brake band 43 is actuated to lock a carrier 58 of the gear train 50 against any rotation relative to the housing 18.

These clutches and the brake are similar to those well known in the art. For example, the gear train 50 is composed of a first sun gear 51, a second sun gear 57, a third sun gear 55, first planetary gears 52, second planetary gears 54, an output shaft 56 and a carrier 58. That is, the gear train 50 is in the form of a planetary bevel gear mechanism in which the first sun gear 51 and the second sun gear 57 are disposed opposite to each other to mesh with each other through the first planetary gears 52, and the second planetary gears 54 are integral with the first planetary gears 52 so as to mesh with the third sun gear 55. The planetary bevel gear mechanism takes the following variable speed meshing positions: In the state of high gear, the front clutch 20 and the rear clutch 30 are actuated so that the first sun gear 51 and the second sun gear 57 rotate at the same number of revolutions. In this state, since the carrier 58 is idle, the output shaft 56 is rotated at the same number of revolutions of the two sun gears 51 and 57 and thus rotation is transmitted in a 1:1 relation, as is apparent from FIG. 1. In low gear, the front clutch 20 and the rear brake 40 are actuated so that rotation at the number of revolutions of the input shaft is imparted to the first sun gear 51, and since the carrier 58 is locked by the rear brake 40 and the second sun gear 57 is idly rotating, the output shaft 56 is rotated at a number of revolutions which is 1/K of the number of revolutions of the input shaft. Here, K is the speed-changing ratio.

When reversing, the rear clutch 30 and the rear brake 40 are actuated so that the rotation of the input shaft is imparted to the second sun gear 57, and since the first sun gear 51 is idly rotating and the carrier 58 is locked by the rear brake 40, the output shaft 56 is rotated in the reverse direction at a number of revolutions which is 1/K of the number of revolutions of the input shaft.

II. Revolution Detecting Means

Means 70 for detecting the number of revolutions of the shaft 11 of the torque converter pump 12 comprises a revolution detector 70 (detail of which will be described later) mounted on the housing 18 and a toothed disc 72 mounted on the torque converter pump 12.

Suppose that the number of teeth of the toothed disc 72 is $\eta_1$, then the revolution detector 71 detects an electrical signal $S_1$ which is $\eta_1$ times the number of revolutions $N_1$ of the torque converter pump 12. Due to the fact that the rotary shaft of the internal combustion engine is connected integrally with the shaft 11 of the torque converter pump 12, the detected electrical signal ($S_1 = \eta_1 N_1$) means that the number of revolutions of the internal combustion engine is detected.

Means 80 for detecting the number of revolutions of the shaft 14 of the torque converter turbine 13 comprises a revolution detector 81 mounted on the housing 18 and a toothed disc 82 mounted on the front clutch drum 21 which is integral with the shaft 14 of the torque converter turbine 13.

The revolution detector 81 may have a structure similar to that of the revolution detector 71, and the toothed disc 82 may also have a structure similar to that of the toothed disc 72. Suppose that the toothed disc 82 has $\eta_2$ teeth, for example, 32 teeth, then the revolution detector 81 detects an electrical signal $S_2$ which is $\eta_2$ times the number of revolutions $N_2$ of the turbine shaft 14. Thus, $S_2 = \eta_2 N_2$. In lieu of detection of the number of revolutions of the shaft 14 of the torque converter turbine 13 by the detecting means 80, a value detected at another position, for example, a value detected by a means 90 for detecting the number of revolutions of the output shaft 56 may be operated in a manner as will be described later. Further, the number of revolutions of the shaft 14 of the torque converter turbine 13 may be detected at any point so long as such point is directly connected to the shaft 14 of the torque converter turbine 13.

The means 90 for detecting the number of revolutions of the output shaft 56 comprises a revolution detector 91 mounted on the housing 18 and a toothed disc 92 connected integrally with the output shaft 56. The revolution detector 91 may have a structure similar to that of the revolution detectors 71 and 81. Suppose that the number of teeth of the toothed disc 92 is $\eta_3$, for example, $\eta_3 = 32$, then the revolution detector 91 detects an electrical signal $S_3$ which is $\eta_3$ times the number of revolutions $N_3$ of the output shaft 56. Thus, $S_3 = \eta_3 N_3$. The following relation holds between $S_2$ and $S_3$:

$$S_2 = K \frac{\eta_2}{\eta_3} S_3 \quad \text{or} \quad S_3 = \frac{\eta_3}{\eta_2 K} S_2 \quad \text{where} \quad K = \frac{N_2}{N_3}$$

(speed-changing ratio). It will thus be understood that the number of revolutions $N_2$ of the shaft 14 of the torque converter turbine 13 can be sought from the number of revolutions $N_3$ of the output shaft 56 by the arithmetic operation described above.

Knowing the number of revolutions $N_3$ of the output shaft 56 enables the speed of the vehicle to be known. Knowing the number of revolutions $N_1$ of the shaft 11 of the torque converter pump 12 means knowing the number of revolutions of the internal combustion engine. Knowing the number of revolutions $N_2$ of the shaft 14 of the torque converter turbine 13 means knowing the revolution ratio between the shaft 11 of the torque converter pump 12 and the shaft 14 of the torque converter turbine 13, hence the slip ratio of the torque converter 10. It is thus possible to detect the state of power transmission in the torque converter 10 in the specific state.

By way of example, the structure of the means 90 for detecting the number of revolutions of the output shaft 56 will be described with reference to FIGS. 8a and 8b. As seen in a side elevation in FIG. 8a, the toothed disc 92 which is secured at its center of rotation to the output shaft 56 is a discoidal plate of magnetic material having 32 equally spaced teeth formed along its circumference, and the revolution detector 91 is mounted on the housing 18 at a position closely adjacent to the toothed disc 92 in the diametral direction of the latter. The revolution detector 91 is composed of a permanent magnet 101 and a coil 102 wound around the permanent magnet 101. The permanent magnet 101 and the coil 102 are housed in a suitable casing of nonmagnetic material and the casing is mounted on the housing 18 so that one end of the permanent magnet 101 is disposed in close proximity to the outer periphery of the toothed disc 92. As the tooth portion of the toothed disc 92 passes through the magnetic field of the permanent magnet 101 as a result of rotation of the toothed disc 92, a variation takes place in the leakage flux of the permanent magnet 101 so that an electromotive force is produced in the coil 102. For example, one complete rotation of the toothed disc 92 produces 32 voltage pulses. As described previously, a voltage signal at an AC voltage $S_3$ having a frequency $\eta_3 \times N_3$ is commonly obtained when the toothed disc 92 having $\eta_3$ teeth rotates at a number of revolutions $N_3$ per unit time. The voltage signal appears across output terminals 103.

The outer peripheral shape of the toothed disc 72 in the means 70 for detecting the number of revolutions of the shaft 11 of the torque converter pump 12 and of the toothed disc 82 in the means 80 for detecting the number of revolutions of the shaft 14 of the torque converter turbine 13 is similar to that of the toothed disc 92, but the former are mounted on the torque converter turbine and the clutch drum in a manner different from the manner of mounting of the latter. Output signal voltages $S_1$, $S_2$ and $S_3$ from the three revolution detecting means 70, 80 and 90 are led to leads 311, 321 and 331 in FIG. 7, respectively.

It is the second feature of the present invention that the numbers of revolutions described above are detected as respective electrical signals, and the respective numbers of revolutions and revolution ratios are subject to electronic operation to issue a speed-changing instruction to a hydraulic actuating circuit 230 according to a preset speed-changing pattern so as to actuate the gear train 50 by the operation of the hydraulic actuating circuit 230.

III. Hydraulic Actuating System

The structure of the hydraulic actuating system is shown in FIGS. 2, 3, 4 and 5. Briefly, the hydraulic actuating system comprises a hydraulic pressure source 250 and a hydraulic actuating circuit 230. The hydraulic actuating circuit 230 includes a manual valve 260, a select or shift valve 270, a solenoid 280, check valves 291 and 295, and hydraulic fluid or oil passages. The hydraulic pressure source 250 includes the hydraulic pump 17, an oil filter 259, an oil pan 258, a pressure-regulating valve 256, a pressure control valve 252, a relief valve 253, an oil cooler 254 and hydraulic fluid or oil passages. The hydraulic pressure source 250 functions to supply oil at pressure to the torque converter 10, to the gears 50 for lubricating same and to the hydraulic actuating circuit 230. (No description will be given herein as to the operation of the hydraulic pressure source 250 as it is well known in the art). The manual valve 260 is composed of a valve spool 262 and a valve casing 261. The valve spool 262 is adapted for interlocking operations with a control lever (not shown) disposed adjacent to the driver's seat so that it takes a corresponding position in response to urging of the control lever to one of the P (parking), R (reverse), N (neutral), D (drive) and L (low-gear) positions. Symbols P, R, N, D and L shown in FIG. 2 represent the corresponding positions of the valve spool 262 which is moved in relation therewith. A groove 263 formed near the left-hand end of the valve spool 262 is adapted to receive therein a link connected to the control lever.

Figure 3:
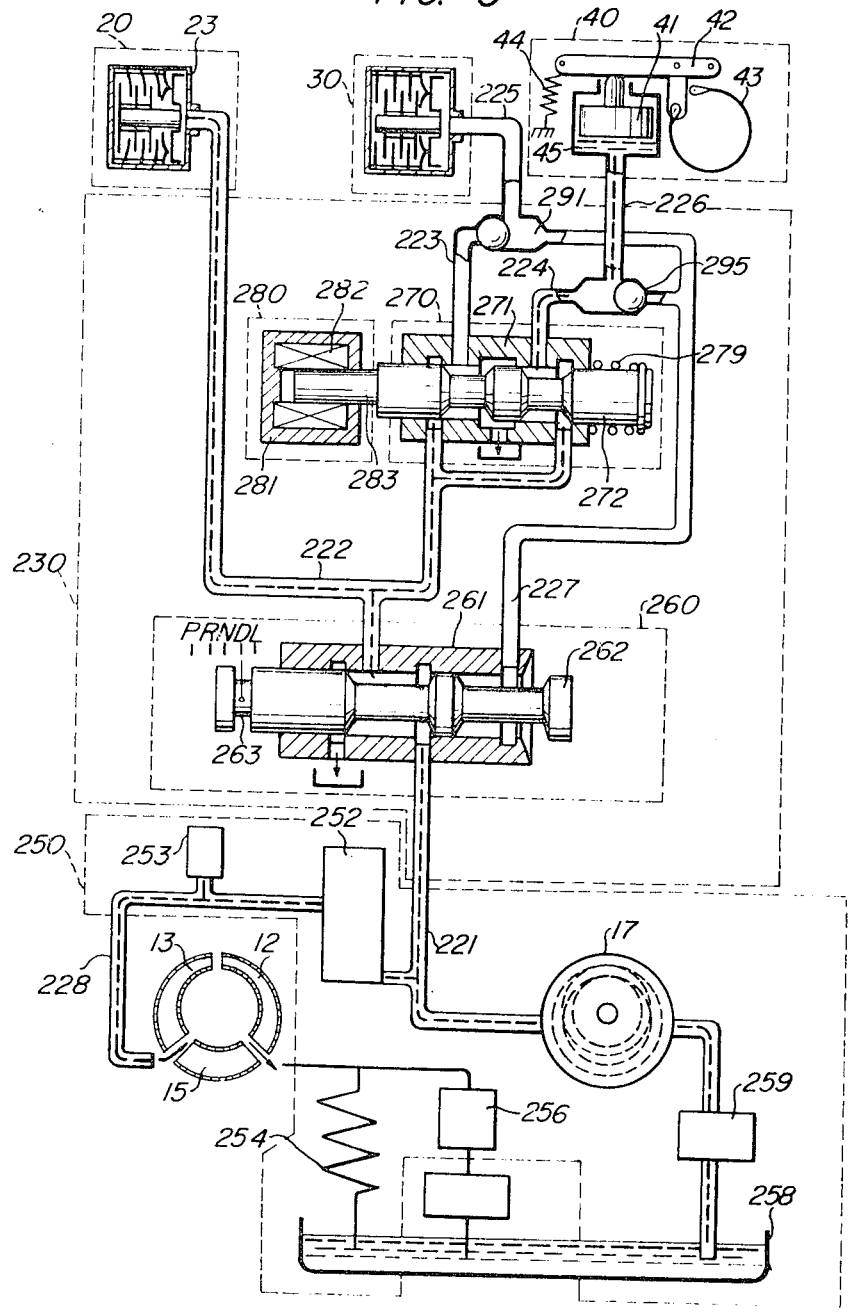
Figure 4:
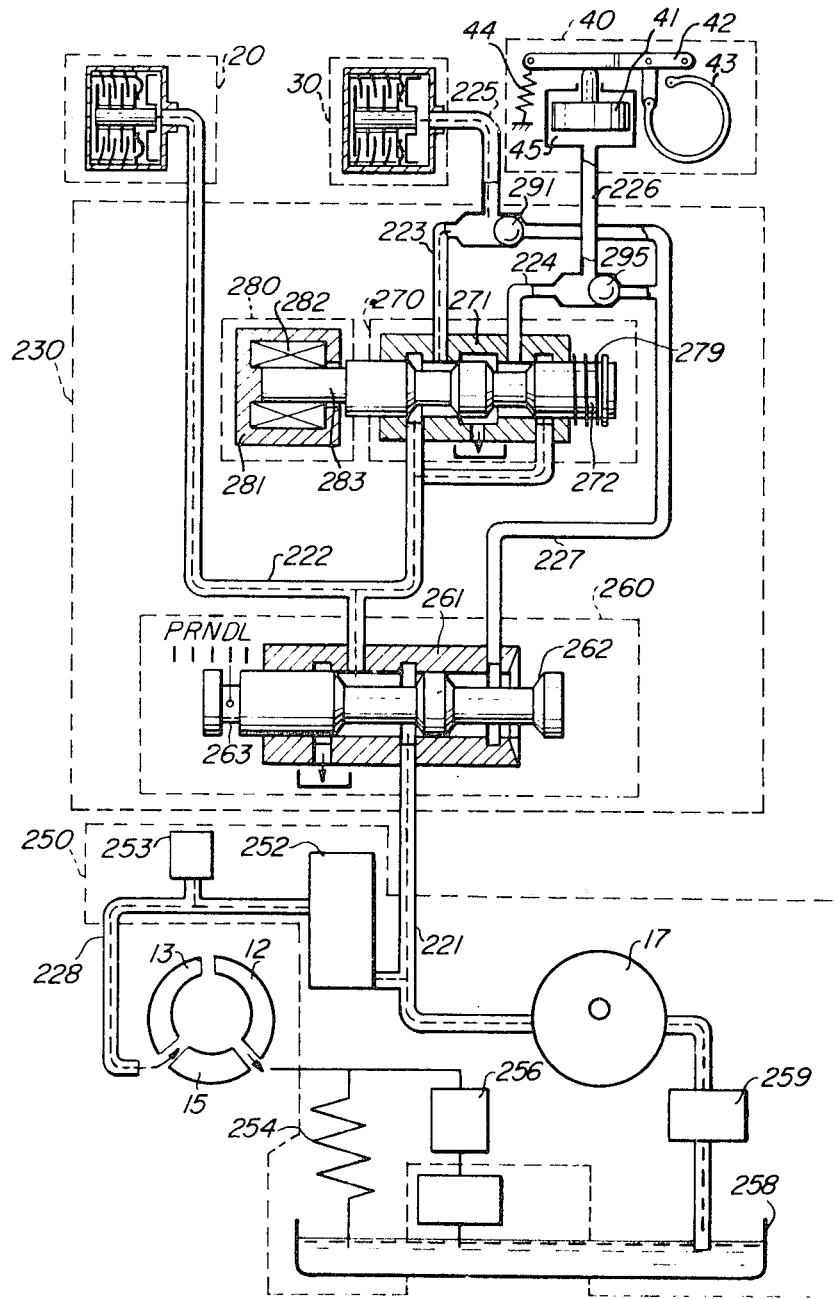
Figure 5:
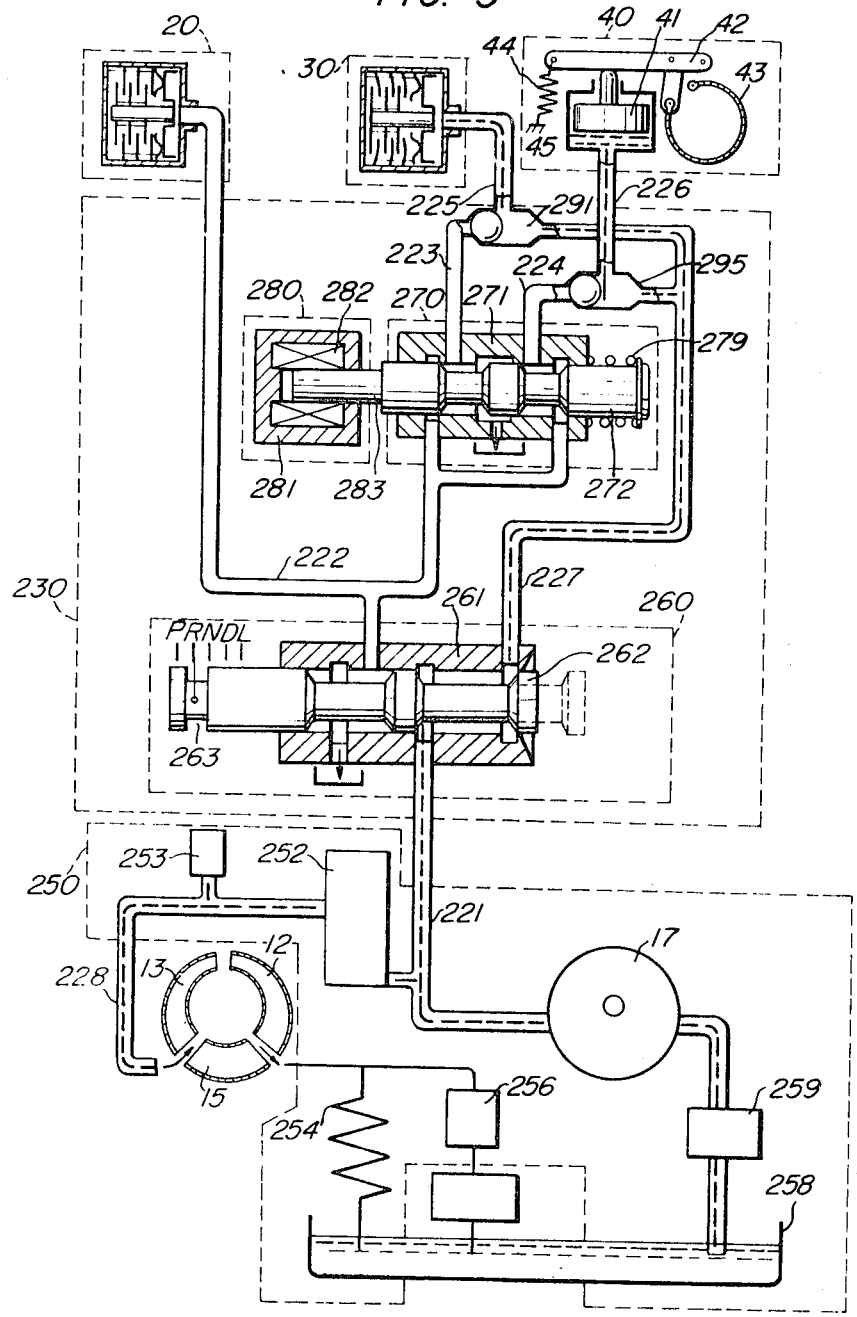

Suppose now that the manual valve 260 is in its N position, then as seen in FIG. 2, an oil passage 221 is closed and oil passages 222 and 227 are drained. When the manual valve 260 is urged to its L position, the oil passage 221 communicates with the oil passage 222 and the oil passage 227 is opened as in the state of the DL position shown in FIG. 3. However, an arrangement is made so that the solenoid 280 is in no way energized at the L position. When the manual valve 260 is urged to its D position or more precisely DL position, the oil passage 221 communicates with the oil passage as seen in FIG. 3 so that hydraulic pressure is applied to the rear brake 40. At the DH position as seen in FIG. 4, hydraulic pressure is applied to the rear clutch 30. When the manual valve 260 is urged to its R position, the oil passage 221 communicates with the oil passage 227 as seen in FIG. 5 and the oil passage 222 is opened. When the manual valve 260 is urged to its P position, the oil passage 221 comes to its end within the valve casing 261, and the oil passages 222 and 227 are drained. The shift valve 270 includes a valve casing 271 and a valve spool 272. One end or left-hand end of the valve spool 272 is connected to a moving core 283 of the solenoid 280. When no current is supplied to the solenoid 280, the valve spool 272 is urged to its rightward position by the action of a spring 279 engaging the other or right-hand end of the valve spool 272 so that the oil passage 222 communicates with an oil passAGE 224 and an oil passage 223 is opened as seen in FIG. 3. When current is supplied to the solenoid 280, the valve spool 272 is urged leftward so that the oil passage 222 communicates with the oil passage 223 and the oil passage 224 is opened as seen in FIG. 4. When the actuating hydraulic pressure is supplied into the oil passage 223, the check valve 291 establishes communication between oil passages 223 and 225 and blocks the oil passage 227 as seen in FIG. 4. On the contrary, when the actuating hydraulic pressure is supplied to the oil passage 227, the check valve 291 establishes communication between the oil passages 227 and 225 and blocks the oil passage 223 as seen in FIG. 3. In response to supply of the actuating hydraulic pressure into the oil passage 224, the check valve 295 establishes communication between oil passages 224 and 226 and blocks the oil passage 227 as seen in FIG. 3. On the other hand, in response to the supply of the actuating hydraulic pressure into the oil passage 227, the check valve 295 establishes communication between the oil passages 227 and 226 and blocks the oil passage 224 as seen in FIG. 5.

In the solenoid 280, the moving core 283 is attracted to move to the left while simultaneously moving the valve spool 272 of the shift valve 270 in that direction as seen in FIG. 4 when current is supplied to a coil 282. The moving core 283 is restored to its rightward position by the force of the spring 279 when the current supply is cut off as seen in FIG. 3. While the solenoid 280 is shown as a preferred electrical actuator in the illustrated embodiment, any other electrical actuator which converts an electrical signal into a mechanical displacement may be employed without departing from the spirit of the present invention.

The gear train 50 is placed in one of the N, D, L, R and P states by the action of the hydraulic elements described above. The detail of the operation will be described hereunder. 1. N state As shown in FIG. 2, the actuating hydraulic pressure is interrupted by the manual valve 260 and all the actuators including the front clutch 20, rear clutch 30 and rear brake 40 are in their released position and are not in operation. Therefore, the shaft 14 of the torque converter turbine 13 can freely rotate. That is, the vehicle is at rest. In FIG. 2, those oil passages illustrated with thick broken lines are applied with the actuating hydraulic pressure. 2. D state The D state involves two states, that is, the DL state and the DH state. More precisely, the DL state indicates the state of low gear in the D state, while the DH state indicates the state of high gear in the D state.

In the DL state, the valve spool 272 of the shift valve 270 takes its rightward position and the valve spool 262 of the manual valve 260 is in its D position as seen in FIG. 3. The actuating hydraulic pressure is supplied to the oil passages 221, 222, 224 and 226 so as to apply pressure to the front clutch 20 and rear brake 40, and the rear clutch 30 is released to be put into low gear.

In the DH state, the valve spool 262 of the manual valve 260 is in its D position and the valve spool 272 of the shift valve 270 takes its leftward position (due to the current supplied to the solenoid 280) as seen in FIG. 4. The actuating hydraulic pressure is supplied to the oil passages 221, 222, 223 and 225 so as to apply pressure to the front clutch 20 and rear clutch 30, and the rear brake 40 is released to set the gear train 50 in the state of high gear. 3. L state In the L state, the valve spool 262 of the manual valve 260 is placed in its L position and the valve spool 272 of the shift valve 270 takes its rightward position. The actuating hydraulic pressure is supplied into the same oil passages as those in FIG. 3 so as to apply pressure to the front clutch 20 and rear brake 40, and the rear clutch 30 is released to set up the state of low gear. 4. R state As seen in FIG. 5, the valve spool 262 of the manual valve 260 is placed in its R position and the valve spool 272 of the shift valve 270 takes its rightward position. The actuating hydraulic pressure is supplied to the rear clutch 30 and rear brake 40 by way of the oil passages 221, 227, 225 and 226, and the front clutch 20 is released to set up the R state. 5. P state In the P state, the valve spool 262 of the manual valve 260 is placed in its P position and the valve spool 272 of the shift valve 270 takes its rightward position. As in the case of the N state shown in FIG. 2, the actuating hydraulic pressure is interrupted by the valve spool 262 with the result that all the actuators are in their released state. Although not shown, a parking device which operates in response to the P position of the manual valve 260 acts to mechanically fix the output shaft 56 against rotation as is commonly known in the art.

The speed change between DH and DL in the D state is automatically effected by energization or deenergization of the solenoid 280. The region of speed change for energizing or deenergizing the solenoid 280 at this speed-changing point will next be described.

IV. Speed Change Region

In the present invention, the state of the internal combustion engine is given by the number of revolutions $N_1$ of the shaft 11 of the torque converter pump 12, the state of the torque converter is given by the slip ratio, and the running state of the vehicle is given by the number of revolutions $N_3$ of the output shaft 56 as previously described. Thus, the speed-changing point required for the vehicle is determined from the magnitudes of these factors.

Conditions for changing speed from the state of low gear to the state of high gear include four kinds of speed-changing limits, that is, the number of revolutions of the internal combustion engine, the vehicle speed, the slip ratio during transmission of torque from the internal combustion engine to the output shaft 56, and the slip ratio during transmission of torque from the output shaft 56 to the internal combustion engine. The speed is changed to high gear when all the limits are exceeded. Conditions for changing speed from high gear to low gear include four kinds of speed-changing limits, that is, the number of revolutions of the internal combustion engine, the vehicles speed, the slip ratio during transmission of the torque from the engine to the output shaft 56, and the slip ratio during transmission of torque from the output shaft 56 to the engine. The speed is changed to low gear when the above limits are exceeded. The four kinds of speed-changing limits are conditions which are independent of each other and the speed change is effected whenever any one of these conditions appear.

Figure 6:
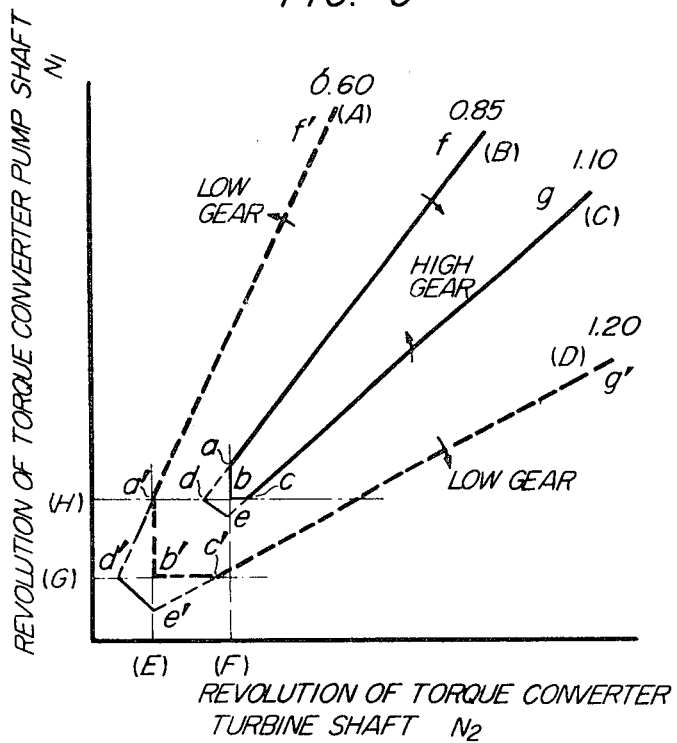
FIG. 6 is a graph showing one example of the speed-changing region.

The vehicle speed can be detected from the number of revolutions $N_3$ of the output shaft 56 as previously described. It is convenient to express the number of revolutions $N_3$ of the output shaft 56 in terms of the number of revolutions $N_2$ of the shaft 14 of the torque converter turbine 13 (according to the manner of computation previously described) since $N_2$ can be graphically drawn on a plane. In the actual speed change the most suitable speed-changing points (lines) are employed which are determined by the performance of the internal combustion engine, performance of the torque converter and performance of the vehicle under the most appropriate conditions within these limits. This can be represented by a graph as shown in FIG. 6 when the vehicle is a passenger car equipped with a gasoline engine. I.

In FIG. 6, speed-changing points (lines) from the state of low gear to the state of high gear are shown by the straight lines H, F, B and C which represent the number of revolutions 1,200 r.p.m. (constant) of the internal combustion engine, the number of revolutions 1,200 r.p.m. (constant) of the output shaft 56 (corresponding to the vehicle speed and expressed in terms of $N_2$), the slip ratio 0.85 (constant) of the torque converter during transmission of torque from the internal combustion engine to the output shaft 56, and the slip ratio 1.10 (constant) of the torque converter during transmission of the torque from the output shaft 56 to the internal combustion engine, respectively. The above values define the speed-changing points (lines) and the speed is changed when these values remain within a specific speed-changing region. More precisely, the speed is changed when these values are shifted to a region defined by $f$-$a$-$b$-$c$-$g$. II.

In FIG. 6, speed-changing points (lines) from the state of high gear to the state of low gear are shown by the straight lines G, E, A and D which represent the number of revolutions 600 r.p.m. (constant) of the engine the number of revolutions 600 r.p.m. (constant) of the output shaft 56 (corresponding to the vehicle speed and expressed in terms of $N_2$), the slip ratio 0.60 (constant) of the torque converter during the transmission of torque from the engine to the output shaft 56, and the slip ratio 1.20 (constant) of the torque converter during transmission of torque from the output shaft 56 to the engine, respectively. Thus, speed is changed when these values make a shift from a region defined by $f'$-$a'b'$-$c'$-$g'$ in FIG. 6. An electronic operating circuit and a logic circuit preferably used for producing a speed-changing signal for effecting speed changing on the basis of the speed-changing points (lines) shown in FIG. 6 will now be described.

V. Electronic Operating Circuit and Logic Circuit

Figure 7:
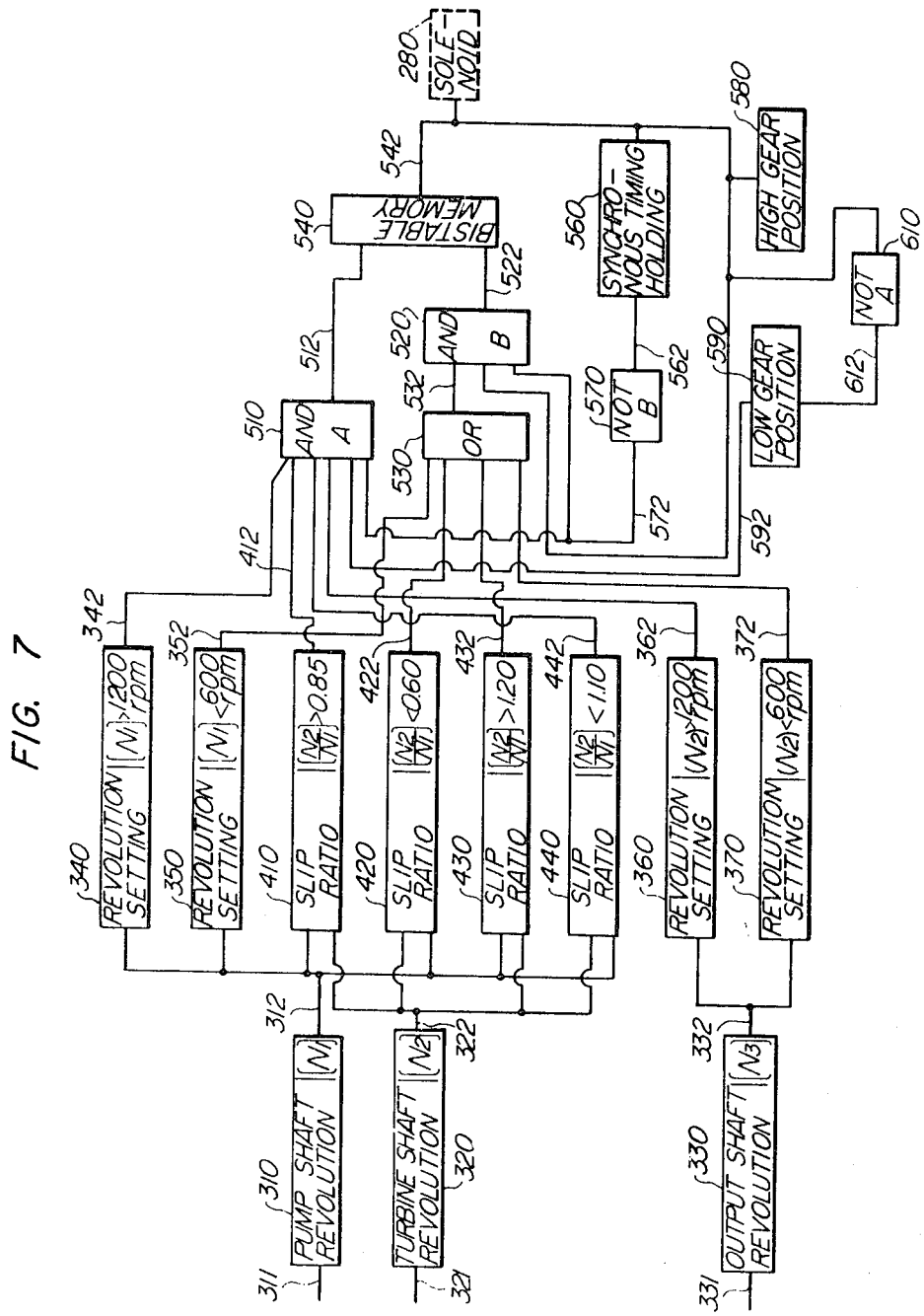
FIG. 7 is a block diagram showing the structure of an electronic operation circuit preferably used in the embodiment of the present invention.

Referring to FIG. 7, the electronic operating circuit and logic circuit for determining the speed-changing point (line) include a circuit 310 for operating the number of revolutions of the shaft of the torque converter pump, a circuit 320 for operating the number of revolutions of the shaft of the torque converter turbine, a circuit 330 for operating the number of revolutions of the output shaft, four slip-operating circuits 410, 420, 430 and 440, four revolution-setting operating circuits 340, 350, 360 and 370, two AND-circuits 510 and 520, and OR-circuit 530, a bistable memory circuit 540, a synchronous timing holding circuit 560, two NOT-circuits 570 and 610, and two gear position circuits 580 and 590. The electronic operating circuit and logic circuit are placed in a state capable of making arithmetic and logical operations as they are connected to a power source by a switch (not shown) when the control lever is set at its D position.

In FIG. 7, a voltage output $S_1$ from the means 70 for detecting the number of revolutions of the shaft 11 of the torque converter pump 12 is applied by way of the lead 311 to the torque converter pump shaft revolution operating circuit 310. An electrical signal $[N_1]$ representing the number of revolutions of the shaft 11 of the torque converter pump 12 is delivered from the circuit 310 by way of a lead 312. (Hereinafter, a bracket is affixed to an electrical signal representing the number of revolutions.) A voltage outputs $S_2$ from the means 80 for the number of revolutions of the shaft 14 of the torque converter turbine 13 is applied by way of the lead 321 to the torque converter turbine shaft revolution operating circuit 320. An electrical signal $[N_2]$ representing the number of revolutions of the shaft 14 of the torque converter turbine 13 is delivered from the circuit 320 by way of a lead 322. A voltage output $S_3$ from the means 90 for detecting the number of revolutions of the output shaft 56 is applied by way of the lead 331 to the output shaft revolution operating circuit 330. An electrical signal $[N_3]$ representing the number of revolutions of the output shaft 56 is delivered from the circuit 330 by way of a lead 332.

The electrical signal $[N_1]$ is supplied by way of the lead 312 to the revolution-setting operating circuit $([N_1] > 1,200$ r.p.m.) 340, and an electrical signal representing $([N_1] > 1,200$ r.p.m.) is delivered from the circuit 340 by way of a lead 342. Similarly, the electrical signal $[N_1]$ is supplied by way of the lead 312 to the revolution-setting operating circuit $([N_1] < 600$ r.p.m.) 350. The electrical signal $[N_3]$ is supplied by way of the lead 332 to the revolution-setting operating circuit $((N_2) > 1,200$ r.p.m. 360 and to the revolution-setting operating circuit $((N_2) < 600$ r.p.m.) 370. Electrical signals representing $([N_1] < 600$ r.p.m.), $((N_2) > 1,200$ r.p.m.) and $((N_2) < 600$ r.p.m.) are delivered from the circuits 350, 360 and 370 by way of leads 352, 362 and 372, respectively. (Here, $(N_2)$ indicates a value obtained by expressing $[N_3]$ in terms of the number of revolutions of the shaft 14 of the torque converter turbine 13.)

The two signals $[N_1]$ and $[N_2]$ are supplied to the slip-operating circuit $([N_2/N_1] > 0.85)$ 410 by way of the leads 312 and 322, respectively. An output voltage signal representing the result of operation of $([N_2/N_1] > 0.85)$ is delivered from the circuit 410 by way of a lead 412. Similarly, the two signals $[N_1]$ and $[N_2]$ are supplied to the slip-operating circuits 420, 430 and 440 by way of the lead 312 and 322. Output voltage signals representing the result of operation of $([N_2/N_1] < 0.60)$, $([N_2/N_1] > 1.20)$ and $([N_2/N_1] < 1.10)$ are delivered from the circuits 420, 430 and 440 by way of leads 422, 432 and 442, respectively.

Output signals from the revolution-setting operating circuit $([N_1] > 1,200$ r.p.m.) 340, slip-operating circuit $([N_2/N_1] > 0.85)$ 410, slip-operating circuit $([N_2/N_1] < 1.10)$ 440, revolution-setting operating circuit $((N_2)$ 1,200 r.p.m.) 360, low-gear position circuit 590 and NOT-circuit 570 are supplied to the AND-circuit A 510 by way of leads 342, 412, 442, 362, 592 and 572, respectively. An output voltage signal representing the result of this logical operation is delivered from the AND-circuit A 510 by way of a lead 512.

Input signals to the AND-circuit B 520 are supplied by way of leads 532, 542 and 572, and an output voltage signal is delivered from the AND-circuit B 520 by way of a lead 522.

Input voltage signals are supplied to the OR-circuit 530 by way of leads 352, 422, 432 and 372, and an output voltage signal is delivered from the OR-circuit 530 by way of the lead 532.

Input voltage signals are supplied to the bistable memory circuit 540 by way of the leads 512 and 522, and an output voltage signal is delivered from the circuit 540 by way of the lead 542.

An input voltage signal is supplied to the synchronous timing holding circuit 560 by way of the lead 542, and an output voltage signal is delivered from the circuit 560 by way of a lead 562.

An input voltage signal is supplied to the NOT-circuit A 610 by the lead 542, and an output voltage signal is delivered from the circuit 610 by a lead 612.

An input voltage signal is supplied to the NOT-circuit B 570 by the lead 562, and an output voltage signal is delivered from the circuit 570 by way of the lead 572.

An input voltage signal is supplied to the high-gear position circuit 580 by way of the lead 542.

An input voltage signal is supplied to the low-gear position circuit 590 by the lead 612, and an output voltage signal is delivered therefrom by the lead 592. The lead 542 is connected to the solenoid 280 so that the output signal from the bistable memory circuit 540 can be supplied to the solenoid 280 by the lead 542.

VI. Components for Electronic Operation Circuit and Logic Circuit

1. Revolution operating circuits

The torque converter pump shaft revolution operating circuit 310, torque converter turbine shaft revolution operating circuit 320 and output shaft revolution operating circuit 330 compute the respective numbers of revolutions when supplied with the voltage signals $S_1$, $S_2$ and $S_3$ described above and have a similar structure. For example, the torque converter pump shaft revolution operating circuit 310 has a structure as shown in FIG. 9. The input voltage signal $S_1$ is supplied to the circuit 310 by the lead 311. In the circuit 310, an amplifying circuit 313 amplifies the signal, an amplitude-limiting circuit 314 limits the amplitude of the signal to a fixed value, and a frequency-DC voltage conversion circuit 315 (which is a frequency detecting and rectifying circuit) converts the AC voltage into a DC voltage, which is then led out by the lead 312. FIG. 10a shows the voltage waveform of the signal $S_1$ and the same waveform remains after the signal $S_1$ is amplified. FIG. 10b shows the waveform of the output from the amplitude-limiting circuit 314. FIG. 10c shows the waveform of the output from the frequency-DC voltage conversion circuit 315, that is, the waveform of the output $[N_1]$ from the revolution operating circuit 310. It will thus be seen that operation of $N_1 = S_1/\eta_1$ is carried out in the circuit 310.

Figure 11A:
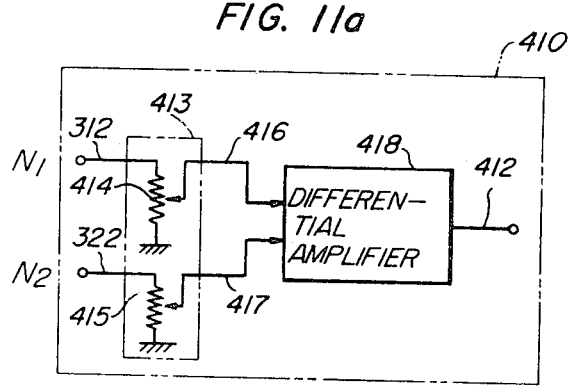
FIGS. 11a and 11b are a block diagram and a circuit diagram, respectively, showing the structure of a slip operating circuit in the circuit shown in FIG. 7.

The constants of a time constant circuit consisting of a resistor and a capacitor disposed in the frequency-detecting circuit portion of the frequency-DC voltage conversion circuit 315, may suitably be varied so that the torque converter turbine shaft revolution operating circuit 320 and output shaft revolution operating circuit 330 can effect respective computations of $N_2 = S_2/\eta_2$ and $N_3 = S_3/\eta_3$. 2. Slip-operating circuits The output voltage signals $[N_1]$ and $[N_2]$ from the respective revolution operating circuits 310 and 320 are supplied by the respective leads 312 and 322 to the four slip-operating circuits 410, 420, 430 and 440 all of which have a similar structure. For example, the slip-operating circuit $([N_2/N_1] > 0.85)$ 410 has a structure as shown in FIG. 11a.

The leads 312 and 322 are connected to one end of respective potentiometers 414 and 415. The other end of the potentiometers 414 and 415 is grounded. Slide terminals 416 and 417 of the respective potentiometers 414 and 415 are connected to a differential amplifying circuit 418 whose output signal appears on the lead 412.

The operation of the slip ratio means the computation of $[N_2/N_1] > 0.85$, and this means that the computation of $[N_2] > 0.85 [N_1]$, hence $[N_2]-0.85 [N_1] > 0$ is carried out. The potentiometer 414 is so set that an output voltage of $0.85 [N_1]$ appears at the slide terminal 416 in response to supply of the signal $[N_1]$ to the potentiometer 414 by way of the lead 312. The potentiometer 415 is so set that an output voltage equal to $[N_2]$ appears at the slide terminal 417 in response to the supply of the signal $[N_2]$ by the lead 322. that is, the lead 322 is directly connected to the slide terminal 417. When these two voltages are supplied to the differential amplifier 418, the difference therebetween, that is, $[N_2]-0.85 [N_1]$ is computed. When the result is positive the difference is amplified to appear as a fixed voltage on the lead 412, while when the result is negative, no output voltage appears on the lead 412. Thus, the appearance of a voltage indicates that $[N_2]-0.85 [N_1] > 0$. This means that $[N_2/N_1] > 0.85$ has been operated.

Figure 11B:
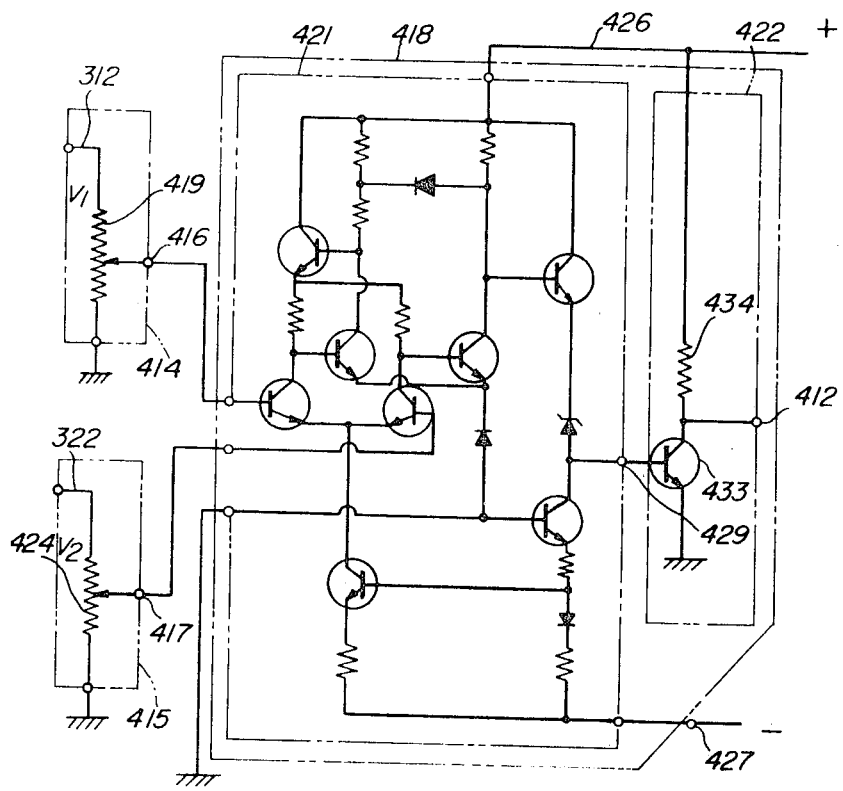

A practical structure of the slip-operating circuit 410 is shown in FIG. 11b. A differential comparison circuit 421 is what is called a linear differential IC circuit element and may, for example, be a circuit element sold under the trade code name of μ pc 71 by Nippon Electric Co., Ltd. Leads 426 and 427 are connected to the positive and negative terminals of a power source, respectively. Zero voltage appears on an output lead 429 when equal voltages are applied to the slide terminals 416 and 417. When the input voltage applied to the slide terminal 416 is larger than the input voltage applied to the slide terminal 417, a positive voltage appears on the output lead 429, while when the input voltage applied to the slide terminal 416 is smaller than the input voltage applied to the slide terminal 417, a negative voltage appears on the output lead 429. An amplifier 422 comprises, for example, a transistor 433 and a load resistor 434 therefor. When a positive voltage is applied to the lead 429, zero voltage appears on the lead 412. (Although there is a voltage drop across the transistor 433 when it conducts, such voltage drop is taken as zero voltage since it has a small value.) When zero voltage or negative voltage is applied to the lead 429, a positive voltage output appears on the lead 412.

The differential comparison circuit 421 and the amplifying circuit 422 constitute the differential amplifier 418. Here, suppose that $R_2$, $R_1$, $V_1$ and $[N_1]$ designate the resistance between the slide terminal 416 of the potentiometer 414 and ground, the resistance of the potentiometer 414, the voltage appearing across the resistance $R_2$ (voltage appearing at the slide terminal 416), and the voltage applied to the lead 312, respectively. Suppose further that $R_2'$, $R_1'$, $V_2$ and $[N_2]$ designate the resistance between the slide terminal 417 of the potentiometer 415 and ground, the resistance of the potentiometer 415, the voltage appearing at the slide terminal 417, and the voltage applied to the lead 322, respectively. Then, it is apparent that $V_1 = R_{21} [N_1]$ and $V_2 = R_2'/R_1' [N_2]$. The relation $V_2 - V_1 > 0$ holds when a positive voltage output appears on the lead 412 as a result of the comparison of these voltages in the differential comparison circuit 421 and subsequent amplification of the differential output in the amplifying circuit 422. That is, $R_2'/R_1' [N_2] - R_2/R_1 [N_1] > 0$, hence, $[N_2] - R_2/R_2' \cdot R_1'/R_1 [N_1] > 0$. Thus, by suitably selecting the values of $R_1$, $R_1'$, $R_2$ and $R_2'$ so as to give the relation $R_2/R_2' \cdot R_1'/R_1 = 0.85$, the result of operation of $[N_2] - 0.85 [N_1] > 0$, hence, $[N_2/N_1] > 0.85$ appears as a positive output voltage on the lead 412. No output voltage appears on the lead 412 when $[N_2/N_1] > 0.85$. When, for example, $[N_2/N_1] > 0.85$ is required, such operation can be effected by applying $[N_2]$ to the lead 322, directly connecting the slide terminal 417 to the lead 322, applying $[N_1]$ to the lead 312, and suitably setting the slide terminal 416 so as to obtain a signal voltage of $0.85 [N_1]$.

It will thus be seen that the operation of $[N_2/N_1] > 1.20$, $[N_2/N_1] > 0.60$ and $[N_2/N_1] > 1.10$ can similarly be carried out by suitably setting the potentiometers and selecting the input terminals. The output voltage signals from the operating circuits 410, 420, 430 and 440 appear on the respective leads 412, 422, 432 and 442. 3. Revolution-setting operating circuits There are four revolution-setting operating circuits 340, 350, 360 and 370. These circuits are operative to determine whether an output signal is to be delivered or not depending on the magnitude of the input voltages $[N_1]$ and $[N_3]$ relative to predetermined values. Although the four revolution-setting operating circuits 340, 350, 360 and 370 are shown in FIG. 7 to illustrate the operating principle of the present invention, the revolution-setting operating circuits 340 and 350 and the revolution-setting operating circuits 360 and 370 may be combined together, respectively, in actual applications. For example, a single revolution-setting operating circuit having two settings may be employed since the speed is changed from low to high gear at $(N_2) > 1,200$ r.p.m., and thereafter it is changed back again from high gear to low gear at $(N_2) < 600$ r.p.m.

Figure 12:
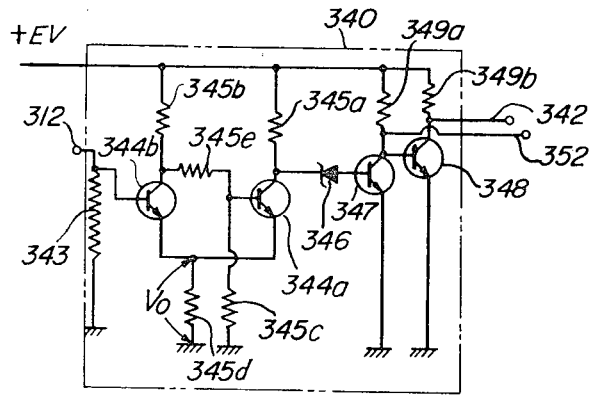
FIG. 12 is a circuit diagram showing the structure of a revolution-setting operating circuit in the circuit shown in FIG. 7.

A practical form of such a revolution-setting operating circuit is shown in FIG. 12. The DC voltage $(N_2)$ led to the terminal of a resistor 343 by way of the lead 312 is applied as an input to a Schmitt circuit composed of transistors 344a and 344b, and resistors 345a, 345b, 345c, 345d and 345e. Since the operating point of the Schmitt circuit is widely variable by varying a voltage Vo across the emitter resistor 345d, the voltage Vo is so selected that the Schmitt circuit operates when the relation $(N_2) \geq K_2 m$ ($m$ is a constant) is reached. Further, the values of the resistors 345b and 345e are so selected that the Schmitt circuit which has been placed in operation when the relation $(N_2) \geq K_2 m$ is reached is restored to its original state when the relation $(N_2) \leq K_2 n$ ($n$ is a constant) is reached as $(N_2)$ is gradually reduced. It is thus possible to detect the straight lines F and E in FIG. 6 by the circuit of FIG. 12. A Zener diode 346, transistors 347 and 348, and resistors 349a and 349b constitute a phase inversion circuit. Thus, a positive output voltage appears on the output lead 342 when the Schmitt circuit is placed in operation and the transistor 344a is cut off, while no output appears from the output lead 342 when the Schmitt circuit is not in operation or is restored to its original state from the operating state and the transistor 344a conducts.

An output lead 352 may be connected to the collector of the transistor 347. A positive voltage signal appears on the output lead 352 when the Schmitt circuit is not in operation or is restored to its original state from the operating state and the transistor 344a conducts. Thus, a single operating circuit can effect two operations of $(N_2) > 600$ r.p.m. and an output signal is delivered therefrom when the respective conditions are satisfied. Any revolution other than 1,200 r.p.m. and 600 r.p.m. can be freely selected by suitably selecting the values of Vo and resistors 345b and 345e. In this manner, it is possible to perform the operations of $N_1 > 1,200$ r.p.m. $N_1 < 600$ r.p.m., $N_3 > 1,200$ r.p.m. and $N_3 < 600$ r.p.m. 4. High-gear position circuit 580, low-gear position circuit 590 and NOT-circuit A 610

In order to make a speed change, it is necessary to know whether the transmission is in low or high gear by employing a signal information.

Thus, the voltage applied to the solenoid 280 is taken as a signal of the high-gear position 580. No. output signal voltage is delivered from the NOT-circuit A 610 (a phase inversion circuit in which no voltage appears at the output when a voltage is applied to the input) when the voltage is applied to the solenoid 280, while an output signal voltage is delivered from the NOT-circuit A 610 when no voltage is applied to the solenoid 280. This output signal voltage is taken as a signal of the low-gear position 590. In lieu of the position signals described above, an electrical signal may be derived from the hydraulic actuating circuit or from a part of the gear train without departing from the spirit of the present invention so long as such signal transmits correctly the shifted gear position. 5. Synchronous timing holding circuit 560

For some time after the power is supplied to the solenoid 280 or the power supply to the solenoid 280 is cut off, the hydraulic actuating circuit and the speed-changing unit are making speed-changing operation, and the speed-changing operations will not be completely effected if another speed changing signal is applied during the above period of time. It is therefore necessary to hold the apparatus in the existing state so that the application of another speed-changing signal may not actuate the apparatus until the speed-changing operation is completely finished.

Figure 13A:
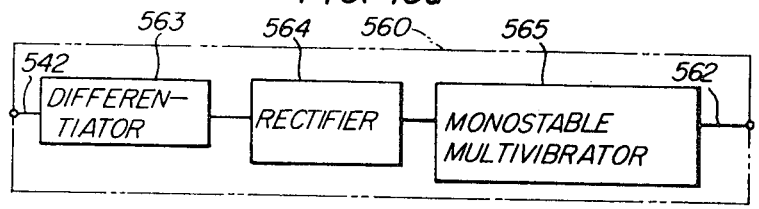
FIGS. 13a and 13b are a block diagram and a circuit diagram, respectively, showing the structure of a synchronous timing holding circuit in the circuit shown in FIG. 7.
Figure 14:
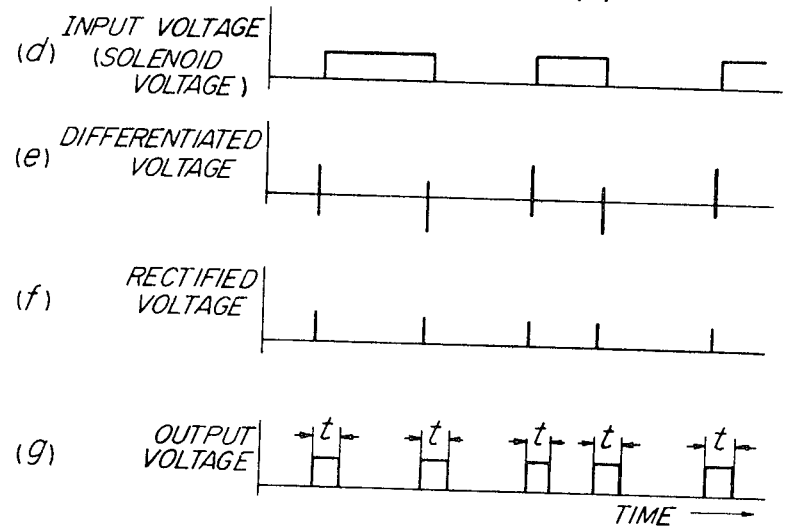
FIG. 14 is a graphic illustration of the operating voltage waveforms in the synchronous timing holding circuit shown in FIG. 13.

This is accomplished by a circuit as shown in FIG. 13A. The synchronous timing holding circuit 560 comprises a differentiation circuit 563, a rectifying circuit 564 and a monostable multivibrator 565. A voltage of a waveform as shown in FIG. 14d applied to the solenoid 280 is led into the synchronous timing holding circuit 560 by way of the lead 542 and is differentiated by the differentiation circuit 563 is a manner, as shown in FIG. 14e. The differentiated voltage signal is rectified by the rectifying circuit 564 in a manner as shown in FIG. 14f. This signal is used to trigger the monostable multivibrator 565 which delivers therefore a pulse output signal whose pulse duration is t as shown in FIG. 14g. This output signal appears on the lead 562.

Figure 13B:
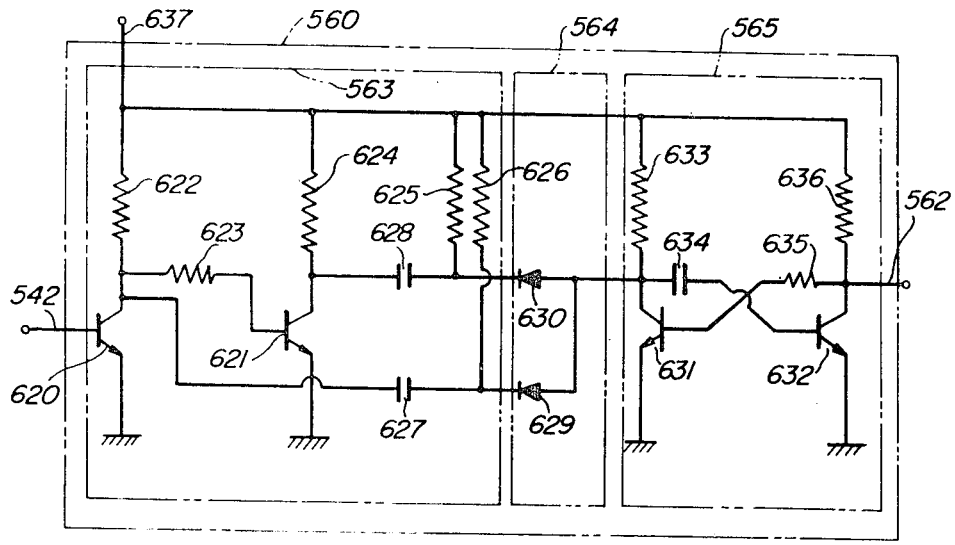

One practical form of such synchronous timing holding circuit 560 is shown in FIG. 13B. The differentiation circuit 563 is composed of phase inverting transistors 620 and 621, resistors 622, 623, 624, 625 and 626 and capacitors 627 and 628. When a positive voltage input signal is applied to the lead 542, a negative differentiated pulse signal appears at the junction of the resistor 626 and the capacitor 627, while a positive differentiated pulse signal appears at the junction of the resistor 625 and the capacitor 628. When the positive voltage input signal applied to the lead 542 disappears, a positive differentiated pulse signal and a negative differentiated pulse signal appear at the respective junctions.

The rectifying circuit 564 is composed of diodes 629 and 630 and transmits solely negative pulses to the monostable multivibrator 565. Therefore, the negative differentiated pulse signal is solely transmitted to the monostable multivibrator 565 when the positive voltage input signal is applied to the lead 542 and when the input signal disappears. The monostable multivibrator 565 is composed of transistors 631 and 632, resistors 633, 635 and 636, and a capacitor 634. A positive voltage signal appears on the output lead 562 when the negative differentiated pulse signal is applied to the monostable multivibrator 565. This positive voltage signal persists for a period of time $t$ which is determined by the resistor 633 and the capacitor 634. The positive voltage signal disappears after the period of time $t$. The voltage signal persisting for the period of time $t$ is reversed in the NOT-circuit B 570 (phase inversion circuit) so that the signal disappears for the period of time $t$. The reversed signal appears on the lead 572.

For the sake of synchronous timing holding, an electrical signal representing the fact that the speed-changing unit has completed a speed change after the supply of power of the solenoid 280 or the cutoff of power supply to the solenoid 280 may be derived from a suitable portion of the hydraulic actuating circuit of speed-changing unit. Such a method is also included in the scope of the present invention. 6. AND circuits 6.1. The AND-circuit A 510 is a conventional AND circuit. Thus, when the signal of $[N_1] > 1,200$ r.p.m. from the revolution-setting operating circuit 340, the signal of $[N_2/N_1] > 0.85$ from the slip-operating circuit 410 the signal of $[N_2/N_1] < 1.10$ from the slip-operating circuit 440, the signal of $(N_2) > 1,200$ r.p.m. from the revolution-setting operating circuit 360, the signal from the low-gear position circuit 590 and the signal from the NOT-circuit B 570 exist simultaneously, an output voltage signal appears on the lead 512.

Figure 16:
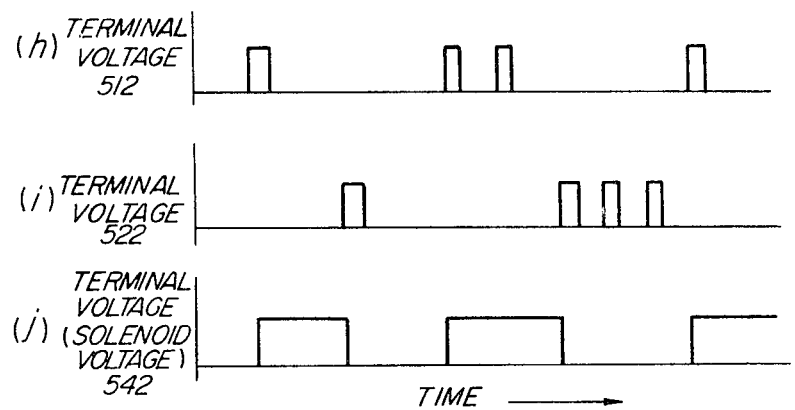
FIG. 16 is a graphic illustration of operating voltage waveforms in the bistable memory circuit shown in FIG. 15.
Figure 15A:
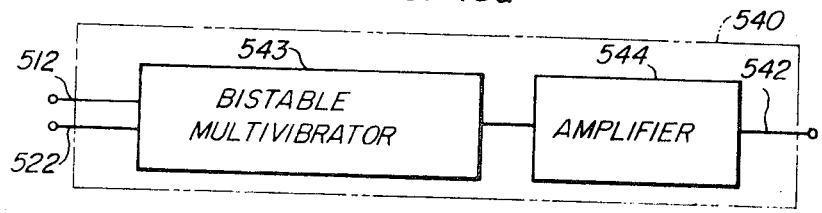
FIGS. 15a and 15b are a block diagram and a circuit diagram, respectively, of a bistable memory circuit in the circuit shown in FIG. 7.
Figure 15B:
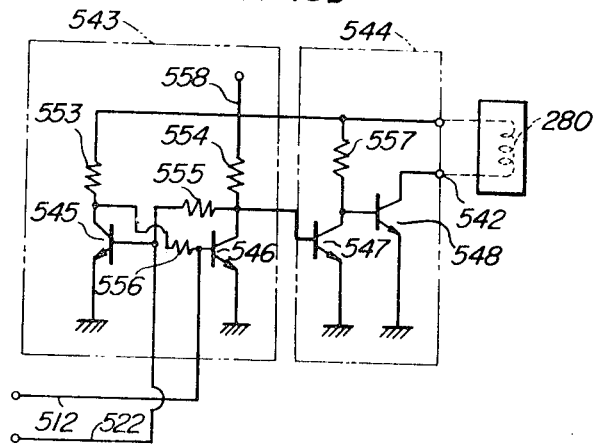

6.2. The AND-circuit B 520 is also a conventional AND circuit. Thus, when the output signal from the OR-circuit 530, the signal from the high-gear position circuit 580, and the signal from the NOT-circuit B 570 exist simultaneously, an output voltage signal appears on the lead 522. 7. OR-circuit 530 actually, the OR-circuit 530 is one which is called by the name of a NOR circuit. Thus, when any one of the output signal from the revolution-setting operating circuit 350, the output signal from the slip-operating circuit 420, the output signal from the slip-operating circuit 430 and the output signal from the revolution-setting operating circuit 370 exists, an output voltage signal appears on the output lead 532. 8. Bistable memory circuit The bistable memory circuit 540 has a structure as shown in FIG. 15a. One practical form of the bistable memory circuit 540 is shown in FIG. 15b. A bistable multivibrator 543 is composed of transistors 545 and 546, and resistors 553, 554, 555 and 556, The leads 512 and 522 are connected to the bases of the respective transistors 546 and 545, and a lead 558 is connected to the positive electrode terminal of a power source. When a positive voltage output signal as shown in FIG. 16h is applied from the AND-circuit A 510 to the lead 512, the transistor 546 conducts so that the potential of its collector becomes substantially zero. Due to the specific characteristic of the bistable multivibrator, that state persists even after the signal disappears. The voltage output is shown in FIG. 16j. The input terminal of an amplifying circuit 544 composed of transistors 547 and 548 and a resistor 557 is connected to the collector of the transistor 545 in the bistable multivibrator 543 so that, when the transistor 548 conducts, power is supplied to the solenoid 280 to energize same which is connected to the collector of the transistor 548. When a positive voltage output signal as shown in FIG. 16i is applied from the AND-circuit B 520 by way of the lead 522, the transistor 545 conducts and the transistor 546 is cut off with the result that the transistor 548 is cut off to deenergize the solenoid 280. The voltage waveform applied to the solenoid 280 is shown in FIG. 16j.

The rectifying circuit 544 thus acts to prevent the operation of the bistable multivibrator 543 from becoming unstable and supplies the large current required for the solenoid 280.

VII. Operation of the Electronic Operating Circuit and Logic Circuit

1. Operation for changing gear from low to high gear

In the case of speed change from low to high gear, arithmetic and logical operations are effected when the speed-changing conditions are shifted to lie in the speed-changing region shown in the solid lines in FIG. 6. The solenoid 280 is energized and the valve spool 272 of the shift valve 270 is urged leftward to shift the hydraulic actuating circuit 230 from the state of FIG. 3 to the state of FIG. 4 with the result that the actuators shift the gear train 50 from low gear to high gear.

Figure 17:
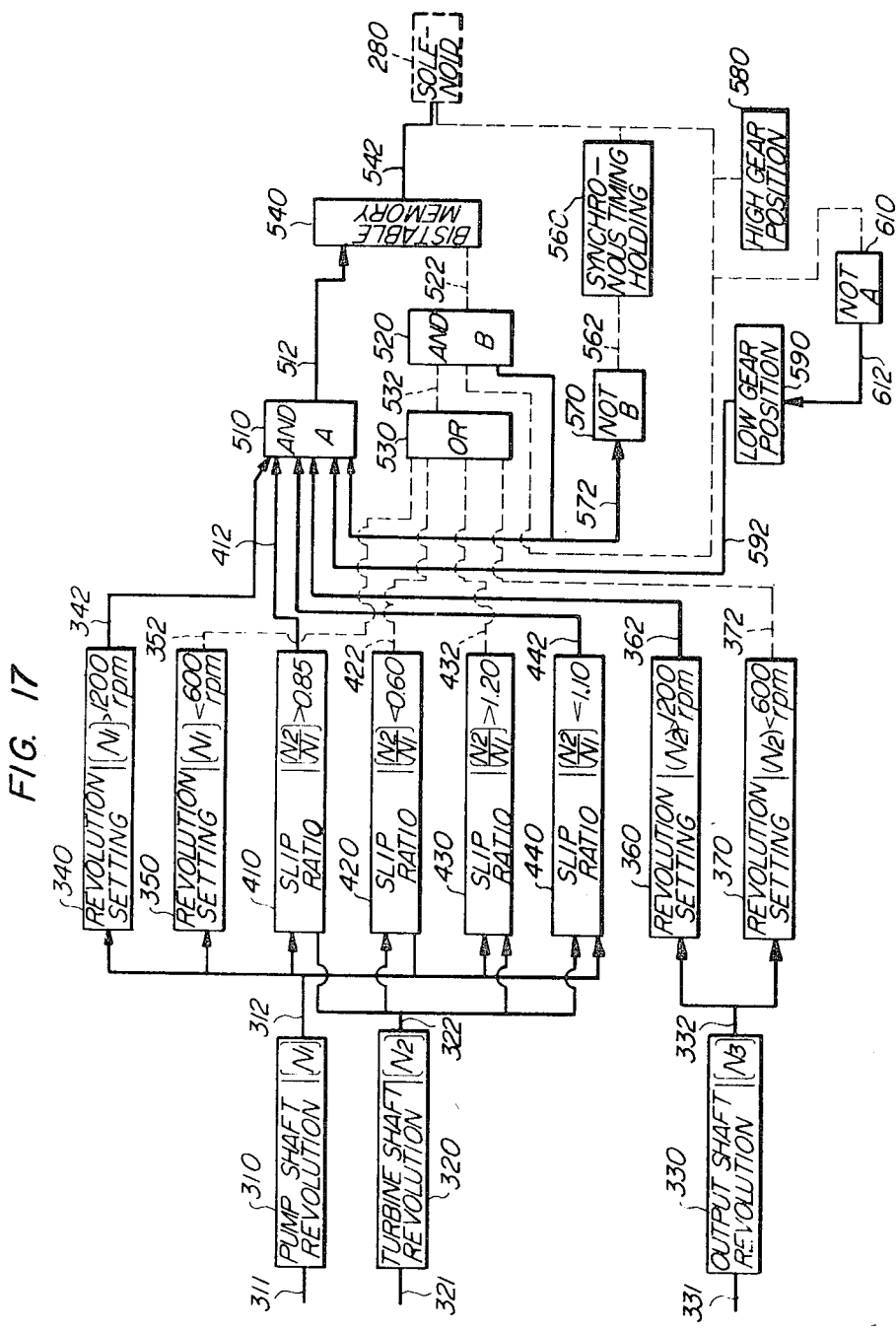
FIG. 17 is a block diagram illustrating the manner of operation of gear changing from low gear to high gear in the circuit shown in FIG. 7.

In FIGS. 17 through 22, those circuits in which voltage signal appears in the circuit arrangement shown in FIG. 7 are connected by solid lines, while those circuits in which voltage signals do not appear are connected by broken lines. As seen in FIG. 17, the solenoid 280 is not energized until the speed is changed. Thus, the NOT-circuit A 610 delivers a signal and hence, the low-gear position circuit 590 delivers a signal. Further, due to the fact that the synchronous timing holding circuit 560 does not deliver a signal, the NOT-circuit B 570 delivers an output signal. These signals are supplied to the AND-circuit A 510.

The condition $[N_1] > 1,200$ r.p.m. holds as the revolution of the internal combustion engine is increased. At a further higher vehicle speed, the condition $(N_2) > 1,200$ r.p.m. holds and the condition $[N_2/N_1] > 0.85$ representing the slip ratio of the torque converter is satisfied. (Of course, the condition $[N_2/N_1] < 1.10$ is also satisfied in this case.) When these conditions are satisfied, output signals are delivered from the respective operating circuits and are supplied to the AND-circuit A 510. Since all the necessary inputs are applied to the AND-circuit A 510, an output signal is delivered therefrom and is supplied to the bistable memory circuit 540.

Figure 18:
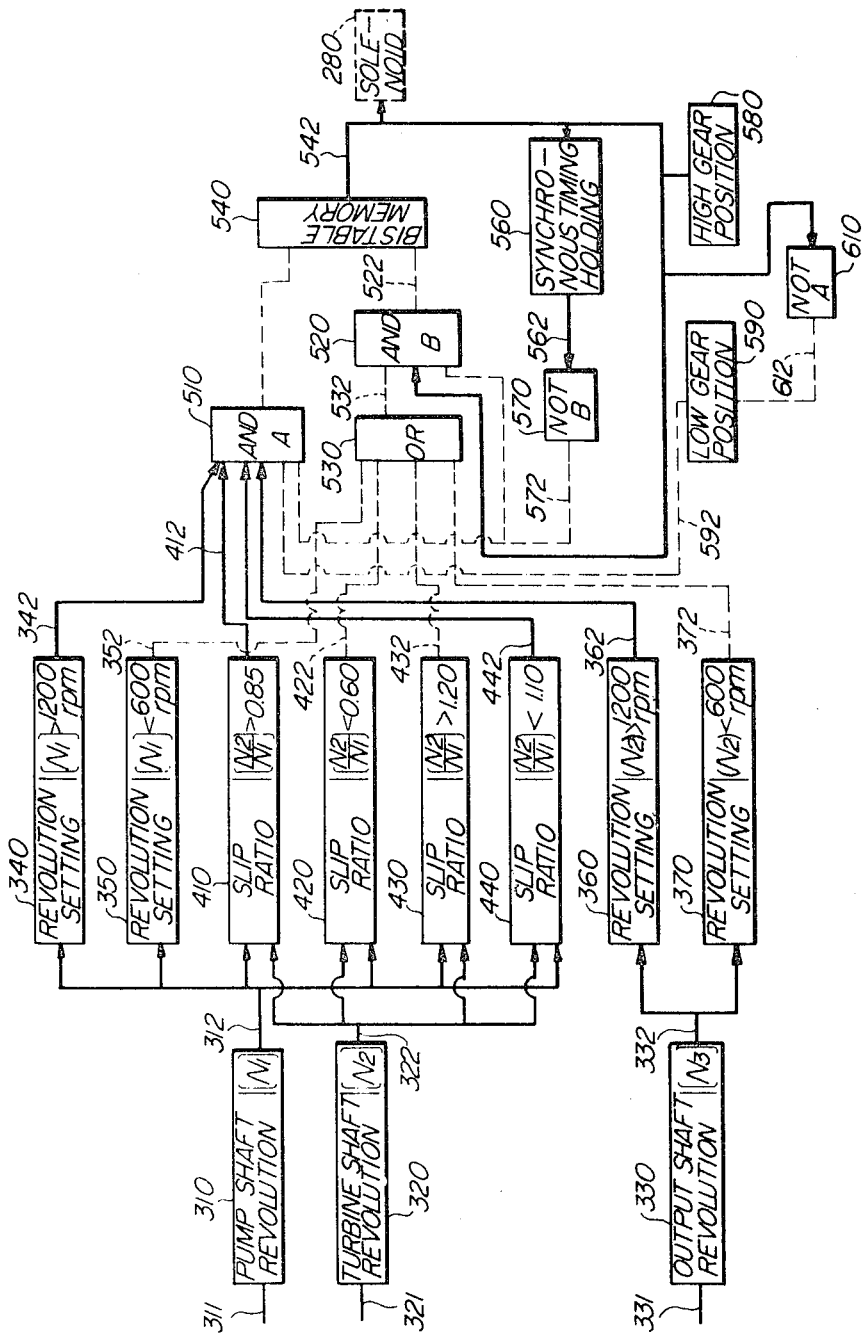
FIG. 18 is a block diagram illustrating the manner of operation under the continuous application of a synchronous timing holding signal after the gear changing from low to high gear.

The signal led into the bistable memory circuit 540 drives same to a stable state ready for the supply of power to the solenoid 280 and power supply to the solenoid 280 is started at the same time as shown in FIG. 18. Therefore, the speed-changing operation of the hydraulic actuating circuit and speed-changing unit is started.

Energization of the solenoid 280 means application of a voltage to the solenoid 280. This voltage is supplied to the synchronous timing holding circuit 560 as an input signal thereto and the synchronous timing holding circuit 560 delivers a voltage signal which persists for a period of time $t$ or $t$ seconds. The NOT-circuit B 570 immediately extinguishes the signal which had existed up until then. Further, as a result of the application of voltage to the solenoid 280, a signal is delivered from the high-gear position circuit 580 and the signal from the low-gear position circuit 590 is extinguished by the NOT-circuit A 610. Since two signals among the input signals to the AND-circuit A 510 do not exist, the output signal from the AND-cicuit A 510 disappears, However, the bistable memory circuit 540 is kept in the set state and the solenoid 280 is kept energized.

Figure 19:
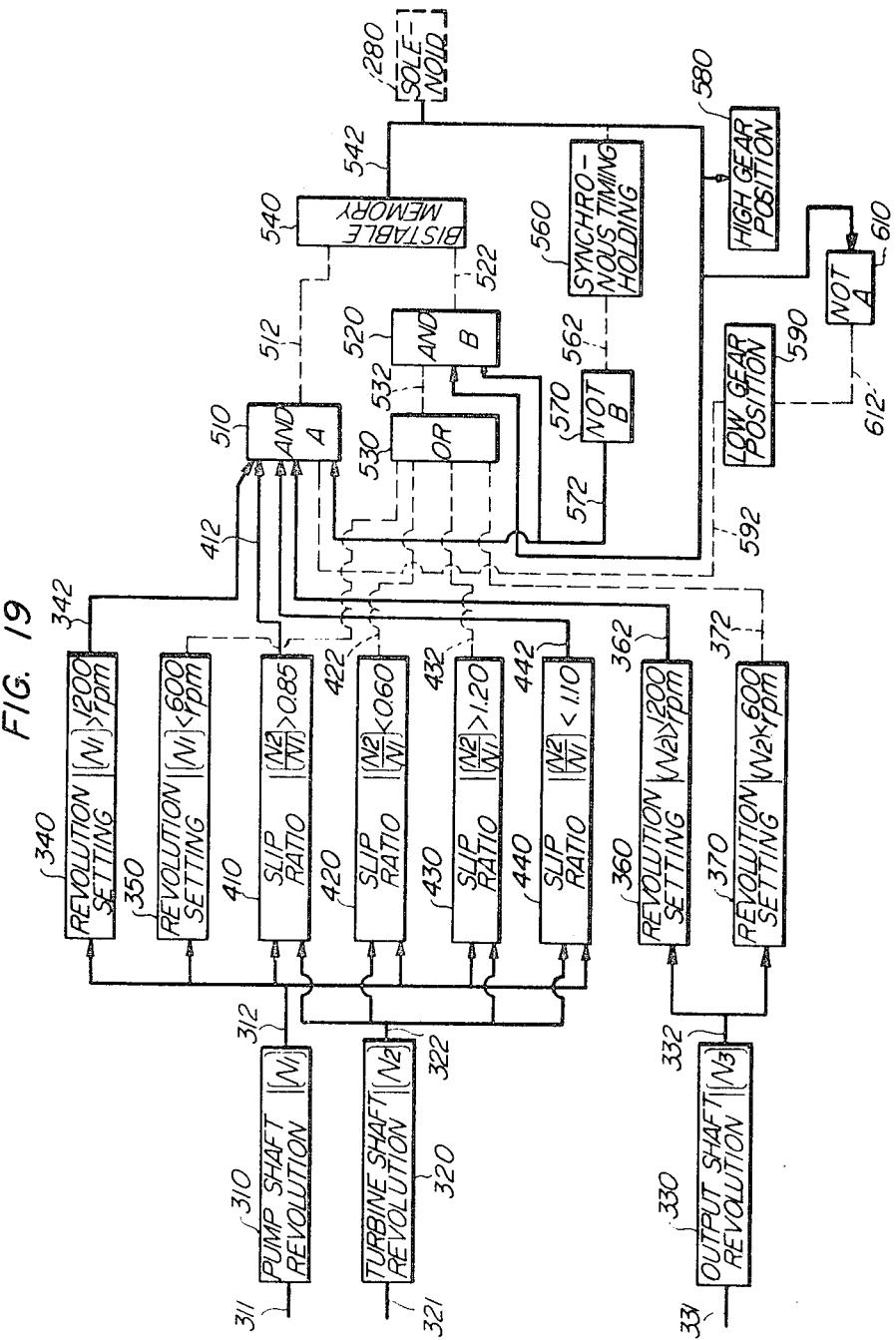
FIG. 19 is a block diagram illustrating the manner of operation under the disappearance of the synchronous timing holding signal after gear changing from low to high gear.

The NOT-circuit B 570 delivers an output signal source since the synchronous timing holding signal disappears after $t$ seconds as shown in FIG. 19. This signal and the high-gear position signal are led to the AND-circuit B 520. Such state or more precisely the state shown in FIG. 19 is one form of the operating state of the electronic operating circuit during running of the vehicle when in high gear. 2. Operation for changing gear from high to low gear In the case of changing gear from high to low gear, arithmetic and logical operations are effected when the speed-changing conditions are shifted to move out of the speed-changing region shown by the broken lines in FIG. 6. The solenoid 280 is deenergized and the valve spool 272 of the shift valve 270 is urged rightward to shift the hydraulic actuating circuit 230 from the state shown in FIG. 4 to the state shown in FIG. 3 with the result that the actuators shift the gear train 50 from high to low gear.

Figure 20:
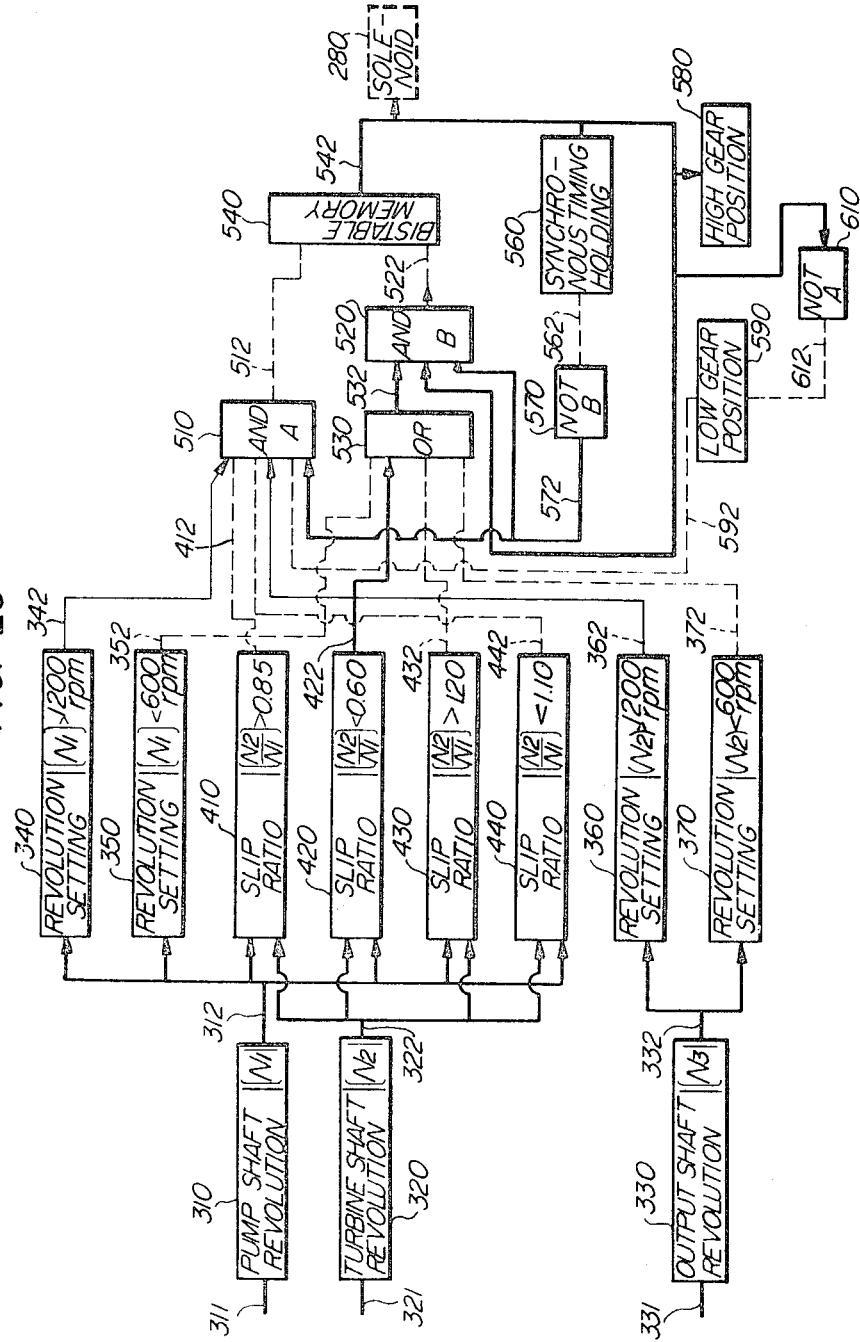
FIG. 20 is a block diagram illustrating the manner of operation when the slip ratio is reduced to a value less than 0.6 in the course of gear changing from high to low gear.

As seen in FIG. 20, the AND-circuit A 510 ceases to deliver the output signal when any one of the input signals thereto including the revolution-setting signals and slip signals disappears prior to the speed change, but the solenoid 280 is still kept in its energized state.

However, the output signal from the NOT-circuit B 570 and the high-gear position signal are led to the AND-circuit B 520. As the running state of the vehicle varies to an extent that the slip ratio is now less than 0.6, and output signal is delivered from the slip-operating circuit ( $[N_2/N_1] < 0.60$) 420 and is supplied to the OR-circuit 530 as seen in FIG. 20. The OR-circuit 520 immediately supplies the output signal to the AND-circuit B 520. The AND-circuit B 520 immediately delivers an output signal because it has all of its inputs.

Figure 21:
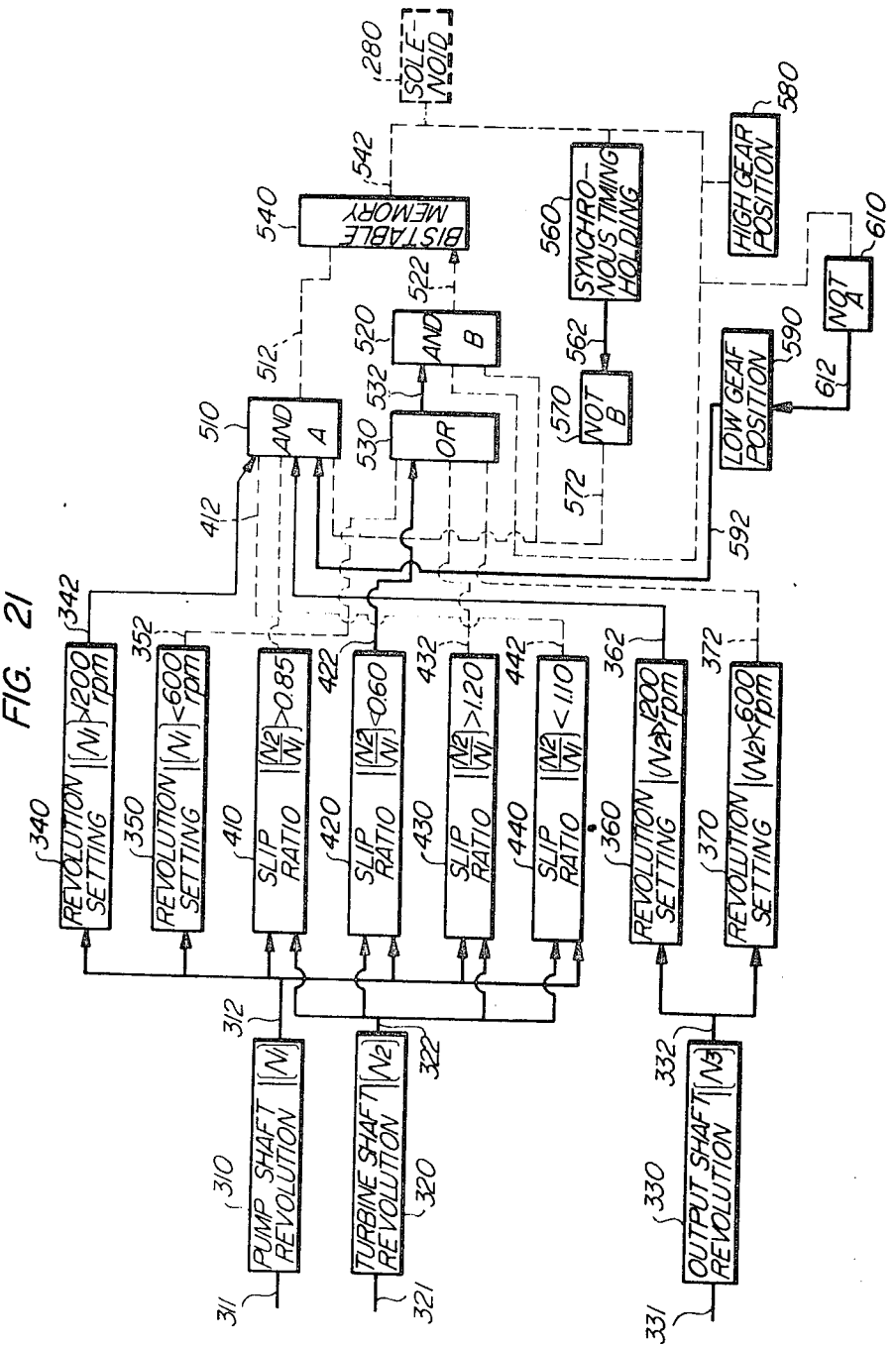
FIG. 21 is a block diagram illustrating the manner of operation under a continuous synchronous timing holding signal after gear changing from high to low gear.

The outputs signal from the AND-circuit B 520 is led into the bistable memory circuit 540 as seen in FIG. 21 with the result that the stable state of the bistable memory circuit 540 is inverted and the solenoid 280 is deenergized at the same time. Since, at this time, the synchronous timing holding circuit 560 delivers a signal for $t$ seconds, the NOT-Circuit B 570 acts to extinguish the signal which has appeared on the lead 572. The output signal from the AND-circuit B 520 disappears because the high-gear position signal also disappears. After $t$ seconds, the signal from the synchronous timing holding circuit 560 disappears as seen in FIG. 22 in which it will be seen that the signal from the NOT-circuit B 570 and the signal from the low gear position circuit 590 are supplied to the AND-circuit A 510, that is, the vehicle is running in low gear.

Figure 22:
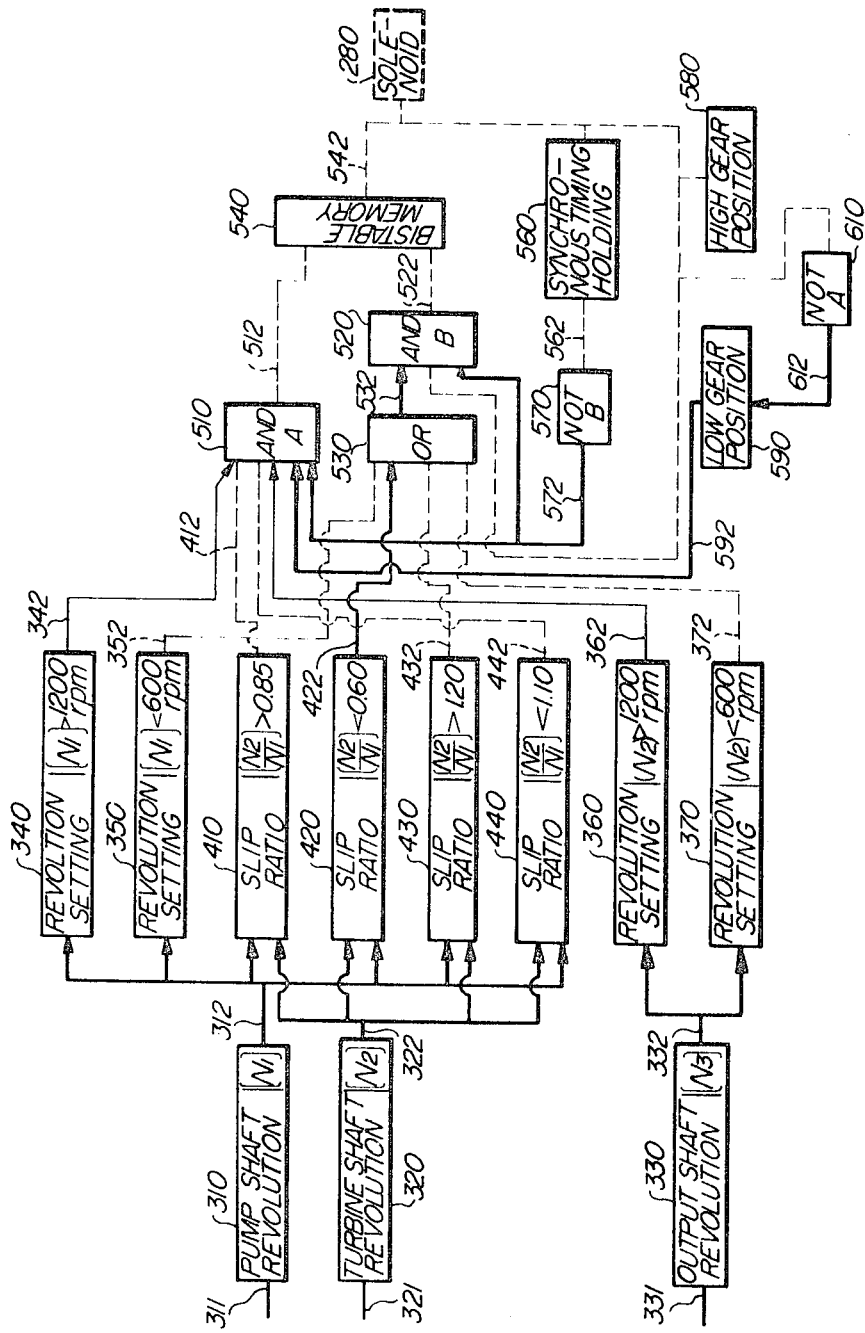
FIG. 22 is a block diagram illustrating the manner of operation under the disappearance of the synchronous timing holding signal after gear changing from high to low gear.

In FIGS. 20, 21 and 22, the signal from the revolution-setting operating circuit ( $[N_1] > 1,200$ r.p.m.) 340 and the signal from the revolution-setting operating circuit (($N_2) > 1,200$ r.p.m.) 360 are shown by thin solid lines as they are independent of the above operation, and any explanation as to such signals will not especially be given herein.

The above description refers to the case in which the signal from the slip-operating circuit ( $[N_2/N_1] < 0.60$) 420 appears. It will be readily understood that, when any one of other signals such as the signal from the slip-operating circuit ($[N_2/N_1] > 1.20$) 430 or the signal from the revolution-setting operating circuit ( $[N_1] < 600$ r.p.m.) 350 and the signal from the revolution-setting operating circuit (($N_2) < 600$ r.p.m. 370 appears, that signal is led into the OR-circuit 530 so that the operation is entirely the same as the operation described with reference to FIGS. 20, 21 and 22 is carried out to effect speed change from high to low gear.

While the present invention has been described with regard to a two-speed gear-changing unit, it will be easily understood that it is also applicable to a three-speed gear-changing unit or to a multispeed gear-changing unit. In such a case too, arithmetic operation of the slip ratio of the torque converter, arithmetic operation of the setting of the number of revolutions of the engine and arithmetic operation of the setting of the number of revolutions representing the vehicle speed may similarly be carried out and these signals are used for the energization or deenergization of a solenoid or solenoids to change over one or a plurality of shift valves (having a function same as or similar to that of the shift valve 270) by means of one or a plurality of solenoids (having a function the same as or similar to that of the solenoid 280) so that the gears can be changed from low to high gear, that 1S, in order of the first, second and third and so on, and the gears can be changed from high to low, that is, from the second to the first, from the third gear to the second gear, and so on. It is apparent that such a speed-changing unit is also included in the scope of the present invention.

VIII. Hydraulic Actuating Circuit of Three-Forward-Speed Automatic Speed-Changing Units A three-forward-speed automatic speed-changing unit can be formed by affixing a front brake 60 to the clutch drum 31 of the rear clutch 30 in the two-forward-speed automatic speed-changing unit. Meshing engagement of gears for the three forward speeds can be attained by combining the front clutch 20, the rear clutch 30 and the rear brake 40 shown in FIG. 1 with the front brake 60 and actuating these elements in a manner as shown in the following table:

|  | Front clutch 20 | Rear clutch 30 | Front brake 60 | Rear brake 40 |
| --- | --- | --- | --- | --- |
| Reverse – R |  | Actuated |  | Actuated |
| Forward: |  |  |  |  |
| First speed – L | Actuated |  |  | Actuated |
| Second speed – DL | Actuated |  | Actuated |  |
| Third speed – DH | Actuated | Actuated |  |  |

An hydraulic actuating circuit preferably employed in the speed-changing unit of the kind described above is shown in FIG. 23, FIG. 23 shows the hydraulic actuating circuit in the R (reverse) position. A front clutch 20, a rear clutch 30 and a rear brake 40 shown therein are similar to those shown in FIGS. 1 and 2. A front brake 60 is composed of a brake piston 61, a brake link 62, a brake band 63, a return spring 64, and brake cylinders 65 and 66. When an actuating hydraulic pressure is applied to the front brake 60, the brake band 63 is actuated to fix the second sun gear 57 of the gear train 50 in position.

Figure 23:
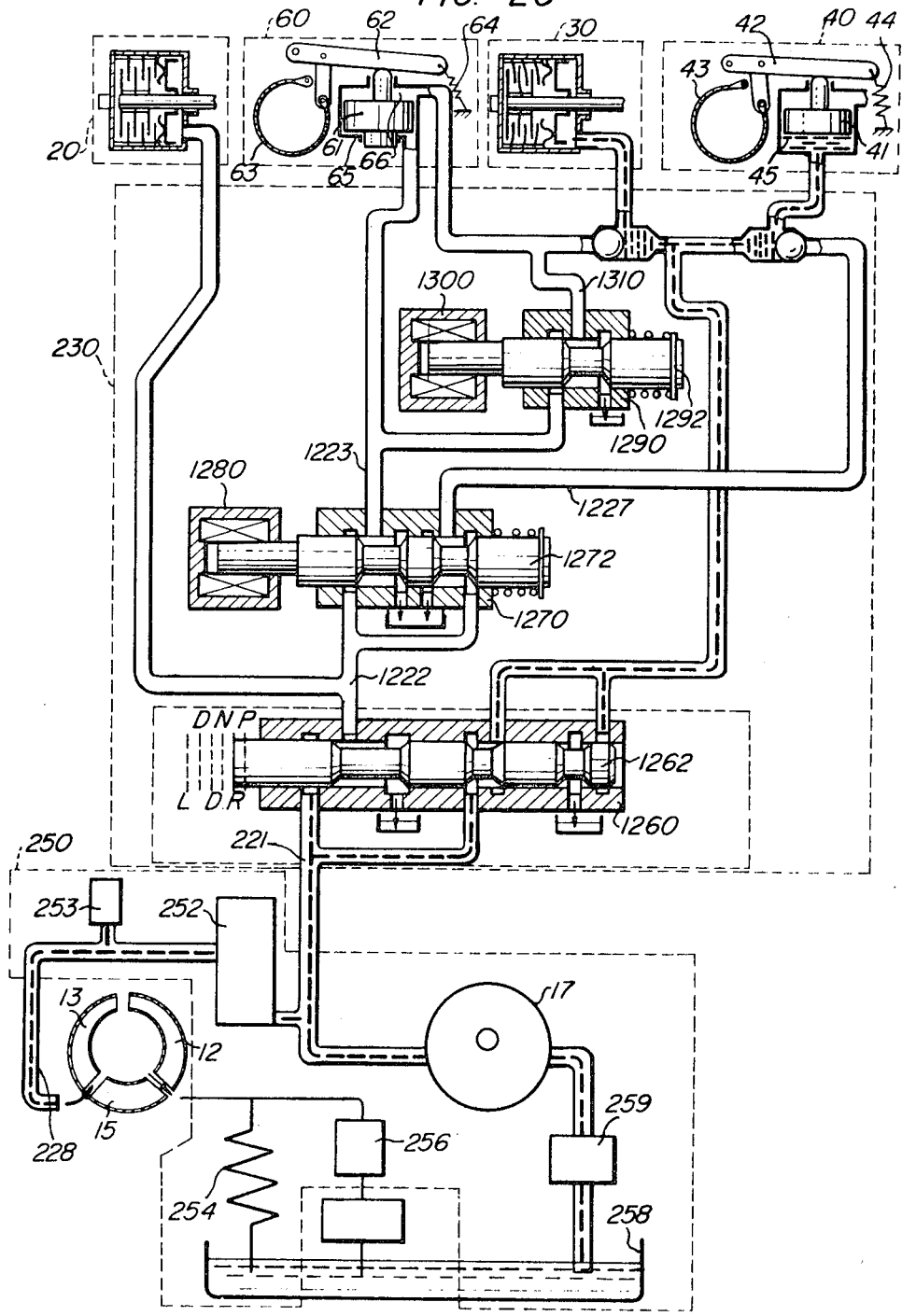
FIG. 23 is a diagrammatic view illustrating the operation of a hydraulic actuating circuit when the present invention is applied to a three-forward-speed automatic transmission system.

Referring to FIG. 23, an oil passage 221 leads to a manual valve 1260 and is divided into two branch passages. An oil passage 1222 leads out of the manual valve 1260 and is divided into three branch passages two of which communicate with a first shift valve 1270. An oil passage 1223 leads out of the first shift valve 1270 is divided into two branch passages, one of which communicates directly with the brake cylinder 65 of the front brake 60 while the other communicates with a second shift valve 1290. An oil passage 1310 leads out of the second shift valve 1290 and is divided into two branch passages which communicate with the rear clutch 30 and the brake cylinder 66 of the front brake 60, respectively. The first shift valve 1270 is provided with a valve spool 1272 which is associated with a solenoid 1280. The second shift valve 1290 is provided with a valve spool 1292 which is associated with a solenoid 1300. A combination of energization of these two solenoids in a manner as shown in the following table accomplishes the meshing engagement of the gears for the first, second and third speeds:

|  | Solenoid 1280 | Solenoid 1300 |
| --- | --- | --- |
| First speed | — | — |
| Second speed | Energized | — |
| Third speed | Energized | Energized |

Energization of the solenoid 1280 urges the valve spool 1272 of the first shift valve 1270 leftward in FIG. 23 thereby to provide communication between the oil passages 1222 and 1223. Deenergization of the solenoid 1280 brings the valve spool 1272 back to the rightward position shown in FIG. 23 thereby to cut off communication between the oil passages 1222 and 1223 and to establish communication between the oil passages 1222 and 1227.

The second shift valve 1290 cuts off communication between the oil passages 1223 and 1310 when its valve spool 1292 is in the position illustrated. Energization of the solenoid 1300 urges the valve spool 1292 leftward in FIG. 23 to provide communication between the oil passages 1223 and 1310. Other elements of the system shown in FIG. 23 are the same as those shown in FIG. 2 and like reference numerals denote like parts appearing in FIG. 2.

IX. Advantages

The present invention has many advantages as follows:

1. The automatic transmission system according to the present invention is composed of three essential parts, a speed-changing unit equipped with a torque converter, a hydraulic actuating circuit, and an electronic operating circuit and a logic circuit. Thus, the hydraulic actuating circuit constitutes an actuator driving system which does not include a signal-operating system. Therefore, the hydraulic actuating circuit has a simple structure and a small size and can easily be mass-produced.

The electronic operating circuit and logic circuit of small size and light weight can easily be obtained by the use of semiconductor elements or by utilizing the technique of large-scale integration and can thus operate with both high precision and reliability.

For the necessary control of the apparatus, the speed-changing unit may merely include therein a conventionally employed hydraulic pump 17 and small-sized revolution-detecting means 70, 80 and 90. Thus, the speed-changing unit is small in size and light in weight. These features, such as small size, light weight, high efficiency and high reliability of the apparatus are effective for use in vehicles, especially automobiles. 2.

In the present invention, the electronic operating circuit operates the slippage, (slip ratio) of the torque converter, the number of revolutions of the engine and the number of revolutions corresponding to the vehicle speed, and the logic circuit discriminates the speed-changing region for the determination of the point of speed change.

It is thus possible to effect speed change in which the performance of the engine, the running state of the vehicle and performance of the torque converter are fully taken into consideration and best utilized. This attains a remarkable improvement in the speed-changing function and enables, for example, an automatic speed change in the case of engine brake. 3.

Simple means such as revolution detectors (such as electromagnetic pickups) and solenoids are used to set up an interrelation between the speed-changing unit equipped with the torque converter, the hydraulic actuating circuit, and the electronic operating circuit and logic circuit.

Further, the speed changing unit, the hydraulic actuating circuit, and the electronic operating circuit and logic circuit are based on solid, fluid, and electrical mechanics respectively. Thus, no unneccessary interference exists therebetween and the operation is stable and free from any variations. 4.

The source 250 of hydraulic pressure for the hydraulic actuating circuit may merely have a suitable fixed hydraulic pressure selected for the specific purpose. Thus, the source has a simple structure and exhibits a high efficiency and high stability. 5. The logic circuit logically operates the speed-changing condition signals in the form of a logical produce and a logical sum. It is thus possible to produce a stable speed-changing signal. 6.

It is possible to very easily alter the speed-changing point (line) which has been quite difficult with the mechanism of prior art hydraulically controlled automatic transmission system. For example, the speed-changing point may simply be altered by varying the setting of a potentiometer in the case of the automatic transmission system of the present invention to deal with vehicles of different kinds. Thus, a few kinds of automatic transmission system are applicable to a wide variety of vehicles. 7.

A vehicle driver can suitably alter the speed-changing point (line) depending on a variation in the operating conditions of the vehicle. Thus, the automatic transmission system can meet wider operating conditions. 8.

Two potentiometers, a differential comparison circuit and an amplifier constitute a slip-operating circuit for the arithmetic operation of the slip ratio. Thus, a simple circuit can give stable operations with high precision. This is effective for the improvement of the speed-changing function which is a primary object of the present invention. 9.

Two revolution-setting operating circuits may be combined into a single circuit which is composed of a Schmitt circuit and a phase inversion circuit. Thus, the circuit has a very simple and compact structure. 10.

A differentiation circuit having a one-phase inversion circuit and two systems of differentiating elements, a rectifying circuit having two diodes, and a monostable multivibrator constitute a synchronous timing holding circuit. As soon as a speed-changing signal is generated at the time of a speed change, the signal is differentiated to produce a positive and a negative differentiated signal. After rectification, the negative signal triggers the monostable multivibrator so that it generates a positive signal which persists for $t$ seconds. Thus, the synchronous timing holding circuit has a very high sensitivity because of the provision of the two systems of differentiating elements can give differentiated signals of sufficient magnitude. 11.

A bistable multivibrator and an amplifying circuit constitute a bistable memory circuit. Thus, a simple circuit can carry out the desired operation for memory, and the automatic transmission system has the stable operation with only moderate hysteresis.

We claim:

1. An automatic transmission system comprising a speed-changing unit equipped with a torque converter including a torque converter pump operatively connected with an input shaft of said speed-changing unit and a torque converter turbine operatively connected with an input shaft for speed-changing gear means, frictionally engaging means for accomplishing the selective meshing engagement of gears in the speed-changing gear means of said speed-changing unit, a hydraulic actuating circuit including a speed-changing region setting valve and a distributing valve for distributing hydraulic fluid to said frictionally engaging means for controlling said frictionally engaging means, first detecting means for generating an electrical signal which is proportional to the rotating speed of the input shaft of the torque converter, second detecting means for generating an electrical signal which is proportional to the rotating speed of either the input of output shaft of said speed-changing gear means, an operating circuit operative, by receiving the electrical output signals from said first and second detecting means, to make an arithmetic operation of the ratio between the rotating speed of the input shaft of said torque converter and the rotating speed of the input shaft or output shaft of said speed-changing gear means, and means operative, in response to an output signal from said operating circuit, to actuate the distributing valve in said hydraulic actuating circuit, said operating circuit being composed of two potentiometers and a differential amplifying circuit including a differential comparison circuit and an amplifying circuit, operative in such a manner that, when the ratio between the rotating speeds lies in a predetermined range, it generates an output signal for actuating said distributing valve thereby to vary the meshing engagement of the gears in said speed-changing gear means.

2. An automatic transmission system comprising a speed-changing unit equipped with a torque converter including a torque converter pump operatively connected with an input shaft of said speed-changing unit and a torque converter turbine operatively connected with an input shaft of speed-changing gear means, frictionally engaging means for accomplishing the selective meshing engagement of gears in the speed-changing gear means of said speed-changing unit, a hydraulic actuating circuit including a speed-changing region-setting valve and a distributing valve for distributing hydraulic fluid to said frictionally engaging means for controlling said frictionally engaging means, first detecting means for generating an electrical signal which is proportional to the rotating speed of the input shaft of the torque converter, second detecting means for generating an electrical signal which is proportional to the rotating speed of either the input or output shaft of said speed-changing gear means, an operating circuit operative, by receiving the electrical output signals from said first and second detecting means, to make an arithmetic operation of the ratio between the rotating speed of the input shaft of said torque converter and the rotating speed of the input or output shaft of said speed-changing gear means, means operative, in response to an output signal from said operating circuit, to actuate the distributing valve in said hydraulic actuating circuit, and a revolution-setting operating circuit composed of a Schmitt circuit and a phase inversion circuit and acting as two revolution-setting operating circuits which generate an output signal when the rotating speed of the input or output shaft of said speed-changing gear means is greater or smaller than a predetermined value, the output signal from said revolution-setting operating circuit and the output signal from said operating circuit for making an arithmetic operation of the ratio between the rotating speeds being used to actuate said distributing valve thereby to vary the meshing engagement of the gears in said speed-changing gear means.

3. An automatic transmission system comprising a speed-changing unit equipped with a torque converter including a torque converter pump operatively connected with an input shaft of said speed-changing unit and a torque converter turbine operatively connected with an input shaft of speed-changing gear means, frictionally engaging means for accomplishing the selective meshing engagement of gears in the speed-changing gear means of said speed-changing unit, a hydraulic actuating circuit including a speed-changing region setting valve and a distributing valve for distributing hydraulic fluid to said frictionally engaging means for controlling said frictionally engaging means, first detecting means for generating an electrical signal which is proportional to the rotating speed of the input shaft of the torque converter, second detecting means for generating an electrical signal which is proportional to the rotating speed of either the input or output shaft of said speed-changing gear means, an input shaft revolution setting operating circuit for generating an electrical output signal when the output signal from said first detecting means reaches a predetermined limit, an operating circuit operative, by receiving the electrical output signals from said first and second detecting means, to make an arithmetic operation of the ratio between the rotating speed of the input shaft of said torque converter and the rotating speed of the input or output shaft of said speed-changing gear means, and means for applying the output signals form both said operating circuits through a bistable memory circuit for actuating the distributing valve in said hydraulic actuating circuit, said bistable memory circuit being composed of a bistable multivibrator and an amplifying circuit.

4. An automatic transmission system comprising a speed-changing unit equipped with a torque converter including a torque converter pump operatively connected with an input shaft of said speed-changing unit and a torque converter turbine operatively connected with an input shaft of speed-changing gear means, frictionally engaging means for accomplishing the selective meshing engagement of gears in the speed-changing gear means of said speed-changing unit, a hydraulic actuating circuit including a manual speed-changing region-setting valve and a distributing valve for distributing hydraulic fluid to said frictionally engaging means for controlling said frictionally engaging means, first detecting means for generating an electrical signal which is proportional to the rotating speed of the input shaft of the torque converter, second detecting means for generating an electrical signal which is proportional to the rotating speed of either the input or output shaft of said speed-changing gear means, a slip-operating circuit operative, by receiving the electrical output signal from said first detecting means and the electrical output signal from said second detecting means, to make an arithmetic operation of the ratio between the rotating speed of the input shaft of the torque converter and the rotating speed of the input or output shaft of the speed-changing gear means, an output shaft revolution setting operating circuit for generating an electrical output signal when the output signal from said second detecting means reaches a predetermined limit, means operative, in response to the output signals from both said operating circuits to actuate the distributing valve in said hydraulic actuating circuit, and a synchronous timing holding circuit composed of a differentiation circuit including one phase inversion circuit and two systems of differentiating elements, a rectifying circuit having two diodes, and a monostable multivibrator, said synchronous timing holding circuit being operative to prevent the occurrence of any different speed changing signals for some period of time after said means for actuating said distributing valve has been operated.

* * * * *